US009459095B2

(12) United States Patent
Korzunov

(10) Patent No.: US 9,459,095 B2
(45) Date of Patent: Oct. 4, 2016

(54) METHOD FOR DETERMINING WHETHER A POINT LIES ALONG A CURVE IN A MULTIDIMENSIONAL SPACE

(71) Applicant: YANDEX EUROPE AG, Lucerne (CH)

(72) Inventor: Anton Vasilyevich Korzunov, Podolsk (RU)

(73) Assignee: YANDEX EUROPE AG, Luzern (CH)

( * ) Notice: Subject to any disclaimer, the term of this patent is extended or adjusted under 35 U.S.C. 154(b) by 0 days.

(21) Appl. No.: 14/939,117

(22) Filed: Nov. 12, 2015

(65) Prior Publication Data

US 2016/0076883 A1    Mar. 17, 2016

Related U.S. Application Data

(63) Continuation of application No. PCT/IB2015/050101, filed on Jan. 6, 2015.

(30) Foreign Application Priority Data

Jun. 30, 2014  (RU) .................................. 2014126497

(51) Int. Cl.
| | | |
|---|---|---|
| *G01B 21/00* | (2006.01) | |
| *G06F 17/10* | (2006.01) | |
| *G06K 9/20* | (2006.01) | |
| *G06T 7/60* | (2006.01) | |
| *G06T 11/20* | (2006.01) | |
| *G01C 21/30* | (2006.01) | |

(52) U.S. Cl.
CPC ............... *G01B 21/00* (2013.01); *G01C 21/30* (2013.01); *G06F 17/10* (2013.01); *G06K 9/20* (2013.01); *G06T 7/60* (2013.01); *G06T 11/20* (2013.01)

(58) Field of Classification Search
None
See application file for complete search history.

(56) References Cited

U.S. PATENT DOCUMENTS

| | | | | | |
|---|---|---|---|---|---|
| 4,882,689 | A | * | 11/1989 | Aoki ...................... | G01C 21/30 340/988 |
| 5,068,656 | A | * | 11/1991 | Sutherland ............. | G08G 1/207 340/989 |

(Continued)

OTHER PUBLICATIONS

Agrawala et al., "Rendering Effective Route Maps: Improving Usability Through Generalization" ACM SIGGRAPH 2001, Aug. 12-17, 2001.*

(Continued)

*Primary Examiner* — Alexander Satanovsky
*Assistant Examiner* — John Kuan
(74) *Attorney, Agent, or Firm* — BCF LLP

(57) ABSTRACT

There is disclosed a computer-implemented method for determining whether a point lies along a first curve in a multidimensional space and program instructions executable for carrying out the method. The method comprises appreciating first curve coordinates defining each of a position and a form of the first curve in the multidimensional space; identifying regions of the multidimensional space each encompassing a respective portion of the first curve while generating a second curve approximating the first curve; and storing, in a non-transitory computer-readable medium, region coordinates of at least one of the regions; whereby an analysis of the region coordinates and point coordinates defining a position of the point in the multidimensional space is executable to provide to a user either an indication that the point lies along the first curve or an indication that the point does not lie along the first curve. Some implementations comprise executing said analysis and providing said indication.

25 Claims, 20 Drawing Sheets

(56) References Cited

U.S. PATENT DOCUMENTS

| | | | |
|---|---|---|---|
| 6,393,159 B1* | 5/2002 | Prasad | G06K 9/44 345/420 |
| 6,882,341 B2 | 4/2005 | Yhann | |
| 7,792,603 B2* | 9/2010 | Hioki | G05B 19/4103 700/187 |
| 8,331,642 B2 | 12/2012 | Zerfass et al. | |
| 8,416,122 B1 | 4/2013 | Pedersen | |
| 8,482,521 B2 | 7/2013 | Abe et al. | |
| 8,483,505 B2 | 7/2013 | Ilbery | |
| 8,508,533 B2 | 8/2013 | Cervelli et al. | |
| 2013/0100502 A1 | 4/2013 | Takahashi et al. | |
| 2013/0142453 A1 | 6/2013 | Kandal et al. | |
| 2013/0278594 A1 | 10/2013 | Kaatz et al. | |
| 2013/0325397 A1* | 12/2013 | Minakawa | G01B 21/20 702/167 |

OTHER PUBLICATIONS

Ogniewicz, "Skeleton-Space: a Multiscale Shape Description Combining Region and Boundary Information" 1994 IEEE.*

International Search Report from PCT/IB2015/050101; May 1, 2015, Shane Thomas.

Java—Computing a polygon that surrounds a multi-point line—Stack Overflow, http://stackoverflow.com/questions/5771908/computing-a-polygon-that-surrounds-a-multi-point-line; retrieved on Nov. 11, 2015.

* cited by examiner

METHOD FOR DETERMINING WHETHER A POINT LIES ALONG A CURVE IN A MULTIDIMENSIONAL SPACE

CROSS-REFERENCE

The present application claims priority to Russian Patent Application No. 2014126497, filed Jun. 30, 2014, entitled "METHOD FOR DETERMINING WHETHER A POINT LIES ALONG A CURVE IN A MULTIDIMENSIONAL SPACE" and is a continuation of International Application No. PCT/IB2015/050101 filed on Jan. 6, 2015, entitled "METHOD FOR DETERMINING WHETHER A POINT LIES ALONG A CURVE IN A MULTIDIMENSIONAL SPACE", the entirety of both of which are incorporated herein by reference.

FIELD

The present technology relates to systems and methods for determining whether a point lies along a curve in a multidimensional space.

BACKGROUND

In many computer applications, first data may be represented by a curve traversing two or more dimensions of a multidimensional space, second data may be represented by a point in the same multidimensional space, and it may be useful to determine whether the point representative of the second data lies along the curve representative of the first data. For example, the first data may represent a roadway across the terrain of a geographic region, and the second data may represent an approximate position of a vehicle within that geographic region, perhaps obtained from a global positioning system (GPS) satellite. In such case, it may be useful to determine whether the vehicle is located along the roadway, for example to assess whether the driver of the vehicle should be told either to continue on their way or to correct course.

Furthermore, as the above example suggests, in some applications it may be useful to tolerate some displacement of the point relative to the curve, such that it may be determined that a point which does not lie precisely "on" the curve nevertheless lies "along" the curve. This gives rise to the problem of determining, with a degree of tolerance, whether the point is sufficiently close to the curve to be deemed to be lying "along" the curve. Conventionally, this problem is resolved by measuring the shortest distance between the point and the curve, which involves computing the distance between the point and every point on the curve. This task can be computationally intensive.

There is therefore a need for improvements to methods for determining whether a point lies along a curve in a multidimensional space.

SUMMARY

In some applications, it is useful to approximate a relatively complex first curve, such as a first curve having many vertices, by a simpler second curve having fewer vertices. For example, such curve approximation may be effected with the goal of reducing the data required to describe the first curve while nonetheless maintaining a sufficient description of the first curve to display it relatively accurately on a digital display.

The present technology arises from an observation made by the inventor that information obtained while generating a second curve which approximates a first curve can subsequently be used to efficiently determine whether a point lies along the first curve. More specifically, some algorithms for generating the second curve may involve explicitly or implicitly identifying regions encompassing portions of the first curve, such that a point determined to lie inside such a region may be deemed to lie along the first curve and/or a point determined to lie outside one or more such regions may be deemed not to lie along the first curve. While information defining these regions is conventionally considered merely incidental in the process of generating the second curve and therefore discarded after generation of the second curve, the present technology preserves this information for the novel purpose of efficiently analyzing whether a point lies along the first curve.

Thus, in one aspect, various implementations of the present technology provide a computer-implemented method for determining whether a point lies along a first curve in a multidimensional space, the method executable by a processor of an electronic device, the method comprising:

appreciating first curve coordinates defining each of a position and a form of the first curve in the multidimensional space;

identifying regions of the multidimensional space each encompassing a respective portion of the first curve while generating a second curve approximating the first curve; and storing, in a non-transitory computer-readable medium, region coordinates of at least one of the regions;

whereby an analysis of the region coordinates and point coordinates defining a position of the point in the multidimensional space is executable to provide to a user either an indication that the point lies along the first curve or an indication that the point does not lie along the first curve.

In some implementations, identifying the regions of the multidimensional space each encompassing a respective portion of the first curve while generating a second curve approximating the first curve comprises identifying a first set of the regions while generating a first version of the second curve, the first version of the second curve being a first polygonal chain; and identifying a second set of the regions while generating a second version of the second curve, the second version of the second curve being a second polygonal chain having more line segments than the first polygonal chain.

In some further implementations, identifying the first set of the regions comprises determining that at least one member of the first set of the regions has a boundary distance greater than a threshold value; and identifying the second set of the regions comprises determining that no member of the second set of the regions has a boundary distance greater than the threshold value.

In some further implementations, generating the second curve comprises executing a Ramer-Douglas-Peucker algorithm, well known to those skilled in the art.

In some implementations, the method further comprises:

appreciating the point coordinates defining the position of the point in the multidimensional space;

executing the analysis of the region coordinates and the point coordinates; and providing, to a user of the electronic device, either the indication that the point lies along the first curve or the indication that the point does not lie along the first curve based on the analysis.

In another aspect, various implementations of the present technology provide a computer-implemented method for determining whether a point lies along a first curve in a multidimensional space, the method executable by a processor of an electronic device, the method comprising:
- reading, from a non-transitory computer-readable medium, region coordinates of at least one of a plurality of regions of the multidimensional space each encompassing a respective portion of the first curve, the plurality of regions having been identified while generating a second curve approximating the first curve;
- appreciating point coordinates defining a position of the point in the multidimensional space;
- executing an analysis of the region coordinates and the point coordinates; and
- providing, to a user of the electronic device, either an indication that the point lies along the first curve or an indication that the point does not lie along the first curve based on the analysis.

In some implementations of any one of the above-recited aspects, providing either the indication that the point lies along the first curve or the indication that the point does not lie along the first curve based on the analysis of the point coordinates and the region coordinates comprises providing the indication that the point does not lie along the first curve after determining that the point lies inside none of the regions.

In some implementations of any one of the above-recited aspects, providing either the indication that the point lies along the first curve or the indication that the point does not lie along the first curve based on the analysis of the point coordinates and the region coordinates comprises providing the indication that the point does not lie along the first curve after:
- determining that the point lies inside a region being a member of a first set of the regions having been identified during generation of a first version of the second curve, the first version of the second curve being a first polygonal chain; and
- determining that the point lies inside no region being a member of a second set of the regions having been identified during generation of a second version of the second curve, the second version of the second curve being a second polygonal chain having more line segments than the first polygonal chain.

In some implementations of any one of the above-recited aspects, providing either the indication that the point lies along the first curve or the indication that the point does not lie along the first curve based on the analysis of the point coordinates and the region coordinates comprises providing the indication that the point lies along the first curve after:
- determining that the point lies inside a region being one of the regions; and
- determining that a boundary distance of the region is no greater than a threshold value, the boundary distance of the region being a shortest distance to a most distant point inside the region from a line approximating the respective portion of the first curve of the region.

In some implementations of any one of the above-recited aspects, providing either the indication that the point lies along the first curve or the indication that the point does not lie along the first curve based on the analysis of the point coordinates and the region coordinates comprises providing the indication that the point does not lie along the first curve after:
- determining that the point lies inside a region being a member of a first set of the regions having been identified during generation of a first version of the second curve, the first version of the second curve being a first polygonal chain, at least one member of the first set of the regions having a boundary distance greater than a threshold value; and
- determining that the point lies inside no region being a member of a second set of the regions having been identified during generation of a second version of the second curve, the second version of the second curve being a second polygonal chain having more line segments than the first polygonal chain, no member of the second set of the regions having a boundary distance greater than the threshold value.

In some implementations of any one of the above-recited aspects, each one of the regions consists of all points no further than a boundary distance from a line approximating the respective portion of the first curve of the one of the regions, the boundary distance being a shortest distance from the line to a point most distant from the line on the respective portion of the first curve. In some such implementations, the multidimensional space has only two dimensions, and each one of the regions is a respective area of the multidimensional space.

In some implementations of any one of the above-recited aspects, the multidimensional space has only two dimensions, and each one of the regions is a respective area of the multidimensional space consisting of
- all points no further than a first boundary distance away from a first side of a line approximating the respective portion of the first curve of the one of the regions, the first boundary distance being a shortest distance away from the first side of the line to a point most distant from the first side of the line on the respective portion of the first curve; and
- all points no further than a second boundary distance away from a second side of the line, the second boundary distance being a shortest distance away from the second side of the line to a point most distant from the second side of the line on the respective portion of the first curve.

In other aspects, various implementations of the present technology provide a non-transitory computer-readable medium storing program instructions for determining whether a point lies along a first curve in a multidimensional space, the program instructions being executable by a processor of an electronic device to carry out one or more of the above-recited methods.

In other aspects, various implementations of the present technology provide an electronic device comprising at least one processor and a memory storing program instructions for determining whether a point lies along a first curve in a multidimensional space, the program instructions being executable by one or more processors of an electronic device to carry out one or more of the above-recited methods.

In the context of the present specification, unless expressly provided otherwise, an "electronic device" is any hardware and/or software appropriate to the relevant task at hand. Thus, some non-limiting examples of electronic devices include computers (servers, desktops, laptops, netbooks, etc.), smartphones, and tablets, as well as network equipment such as routers, switches, and gateways.

In the context of the present specification, unless expressly provided otherwise, the expression "computer-readable medium" is intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular filesystem, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
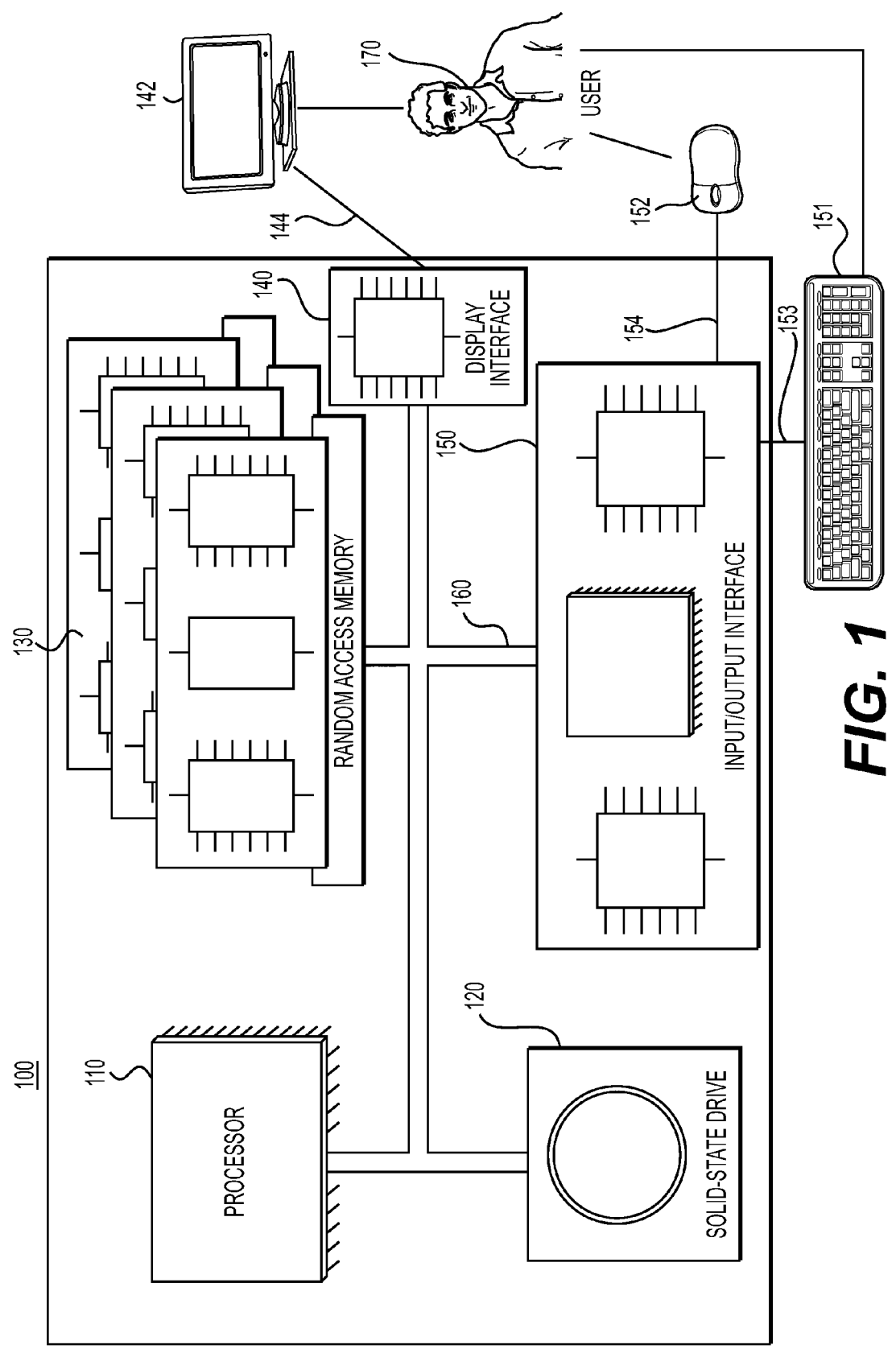
FIG. 1 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1, there is shown a computer system 100 suitable for use with some implementations of the present technology, the computer system 100 comprising various hardware components including one or more single or multi-core processors collectively represented by processor 110, a solid-state drive 120, a random access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a user 170, and the input/output interface 150 may be coupled to a keyboard 151 (e.g. via a USB cable 153) and a mouse 152 (e.g. via a USB cable 154), each of the keyboard 151 and the mouse 152 being operable by the user 170.

According to implementations of the present technology, the solid-state drive 120 stores program instructions suitable for being loaded into the random access memory 130 and executed by the processor 110 for determining whether a point lies along a curve in a multidimensional space. For example, the program instructions may be part of a library or an application.

Figure 2:
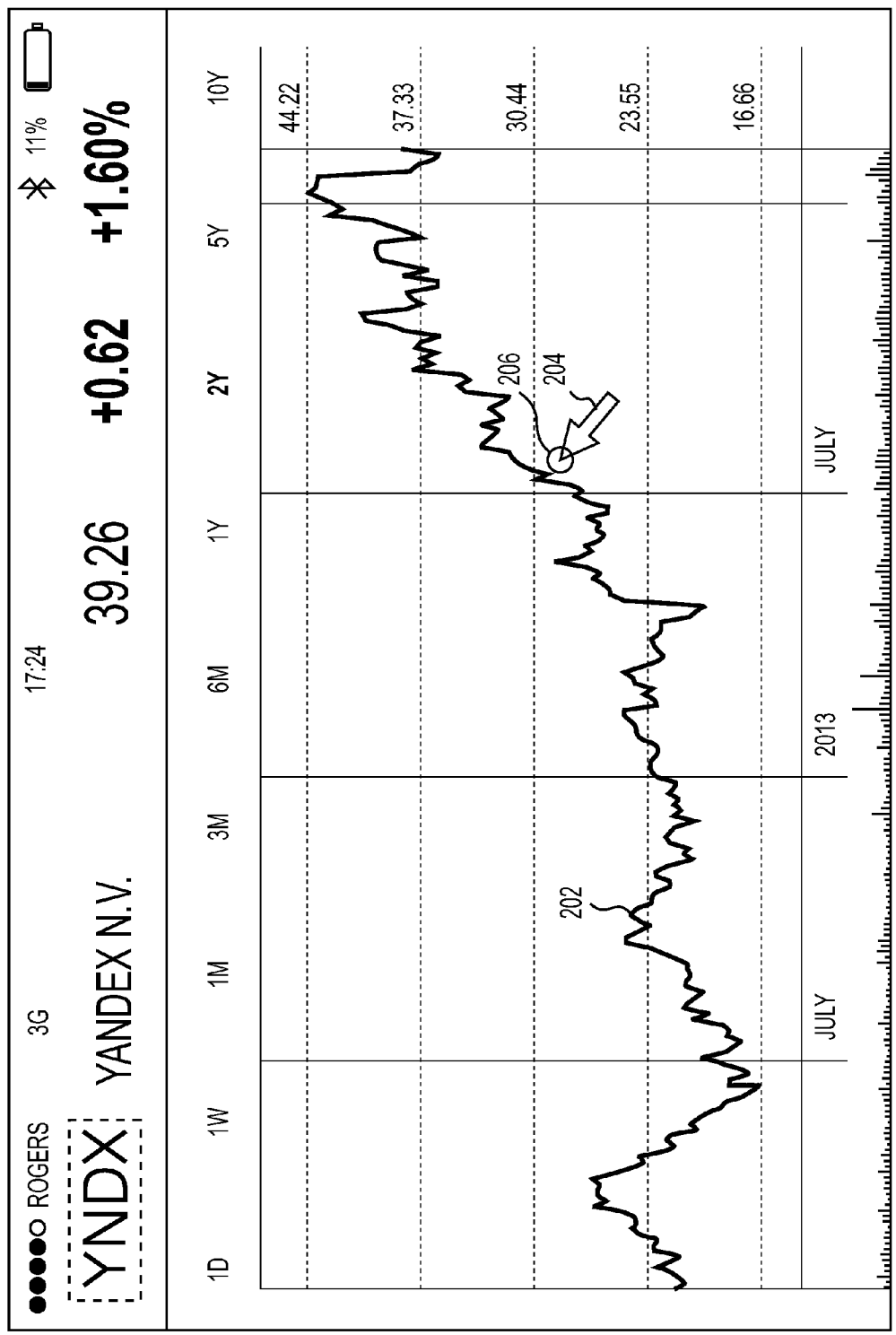
FIGS. 2 to 4 are screenshots of a stock charting application illustrating an implementation of the present technology.

In FIG. 2, there is shown a screenshot of a stock charting application 200 running on processor 110 of computer system 100 of FIG. 1, as possibly displayed on display 142 via display interface 140. The stock charting application 200 displays a stock price line 202 indicative of variations in the price of shares of Yandex N.V., traded under the ticker "YNDX" on the NASDAQ stock exchange, from early 2012 until early 2014. The screenshot image 200 also includes a cursor 204 which may be moved on the display 142 by user 170 via mouse 152 and input/output interface 150. Using mouse 152, user 170 has clicked on a click point 206 of the stock charting application 200, point 206 being close to but not directly on stock price line 202.

Figure 3:
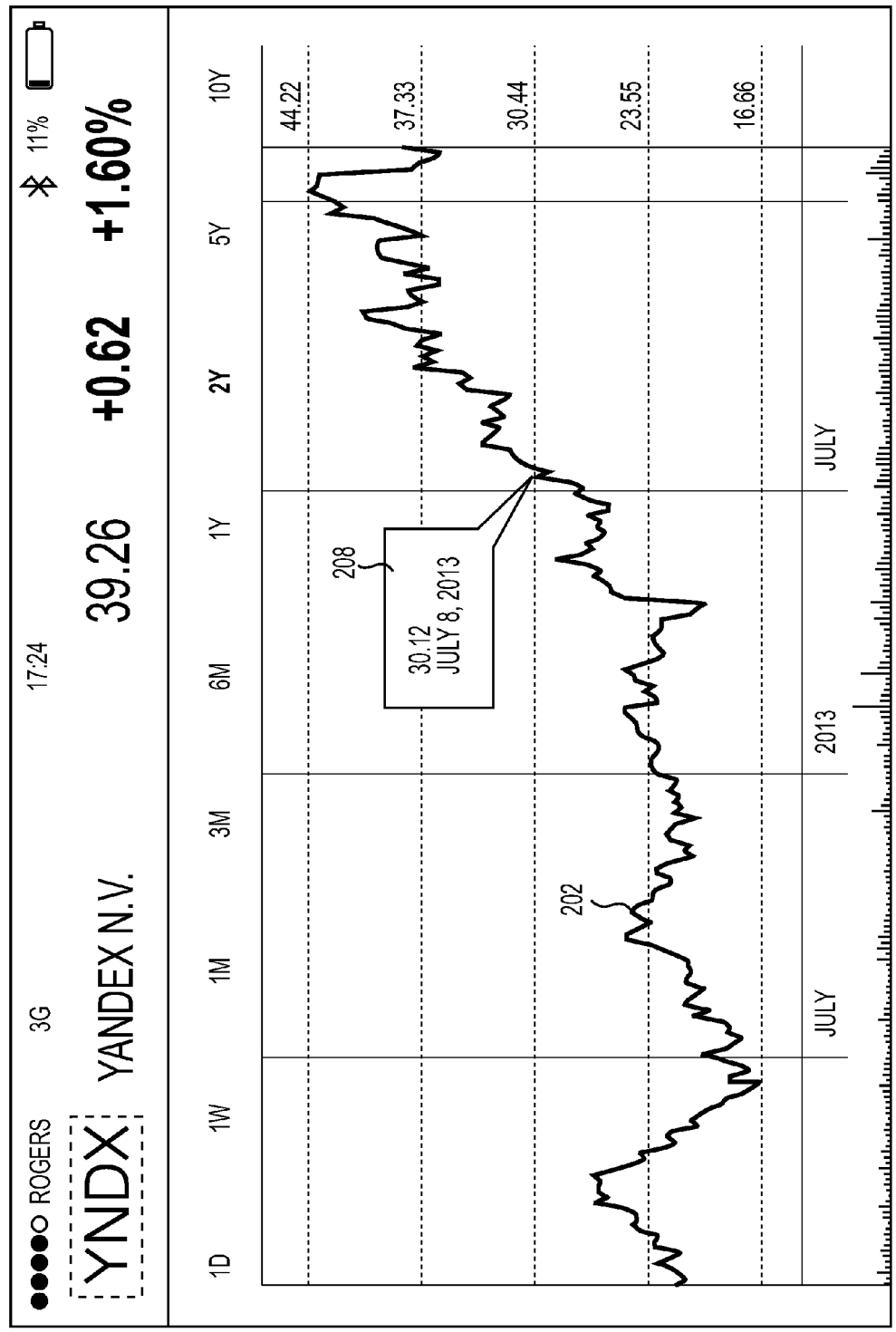
Figure 4:
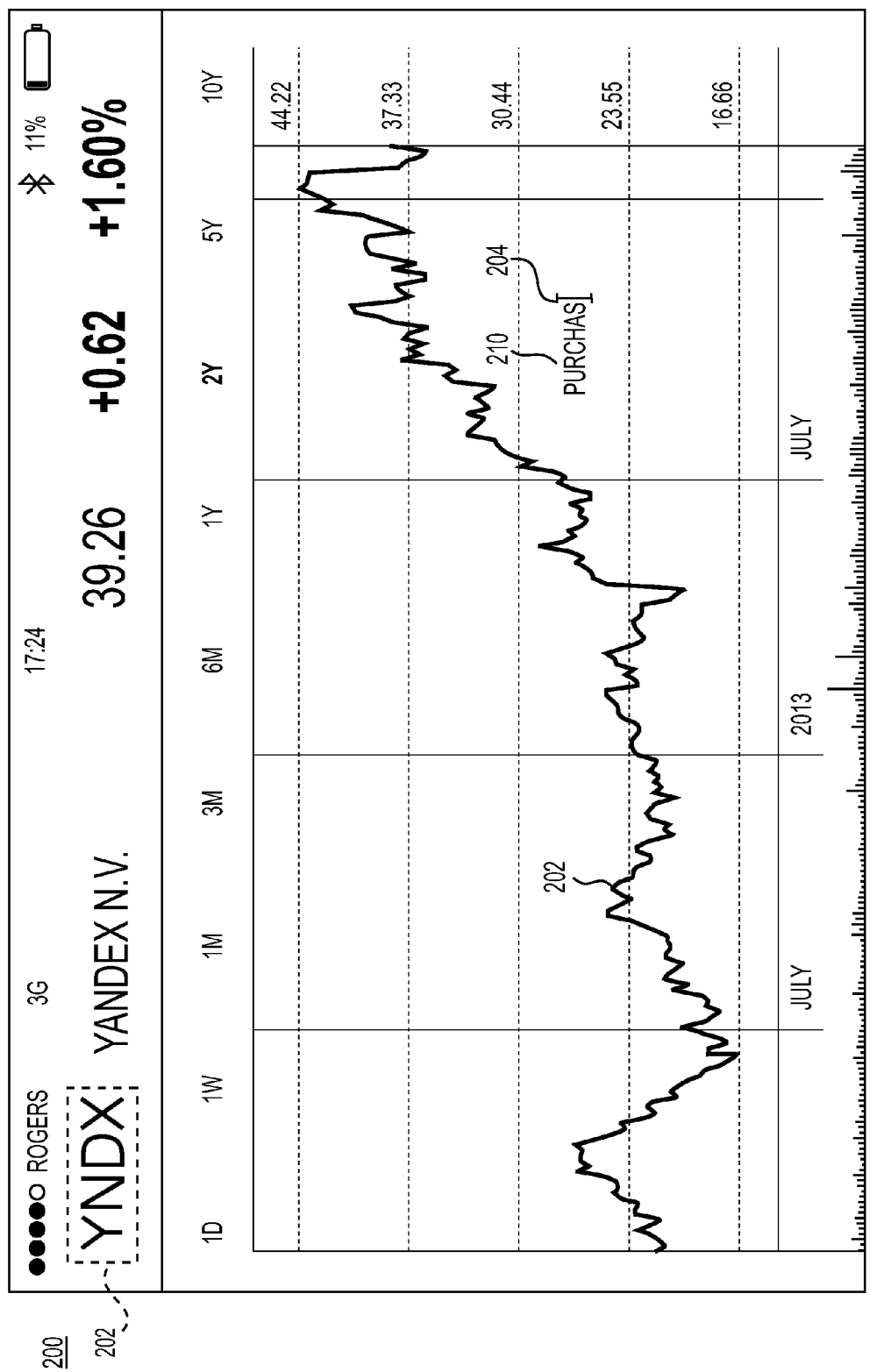

Each of FIG. 3 and FIG. 4 shows a potential screenshot of stock charting application 200 as it may appear on the display 142 of computer system 100 after the user 170 clicks mouse 152 on click point 206 of FIG. 2, depending on whether the stock charting application 200 determines that the click point 206 does or does not lie along stock price line 202. More specifically, FIG. 3 shows a screenshot of stock charting application 200 having determined that click point 206 lies along stock price line 202. The screenshot includes further information 208 associated with a portion of the stock price line 202 nearest the click point 206. By thus displaying the further information 208 on the display 142, the stock charting application 200 provides an indication to user 170 that it has determined that click point 206 lies along the stock price line 202.

Alternatively, FIG. 4 shows a screenshot of the stock charting application 200 as it may appear on the display 142 after stock charting application 200 has determined that click point 206 does not lie along stock price line 202, stock charting application 200 having therefore interpreted user 170's click of the mouse 152 on click point 206 as an indication of a desire to enter a text entry mode so as to overlay text 210 on the stock charting application 200 at click point 206. FIG. 4 shows text 210 having been entered by user 170, for example by typing on keyboard 151, with a cursor 204 providing an indication to the user 170 of a location (the end of text 210) where new characters typed on keyboard 151 will appear. By thus varying the appearance of cursor 204 from an arrow style (as in FIG. 2) to a text cursor style (as in FIG. 4), stock charting application 200 provides an indication to user 170 that it has determined that click point 206 does not lies along the stock price line 202.

Figure 5:
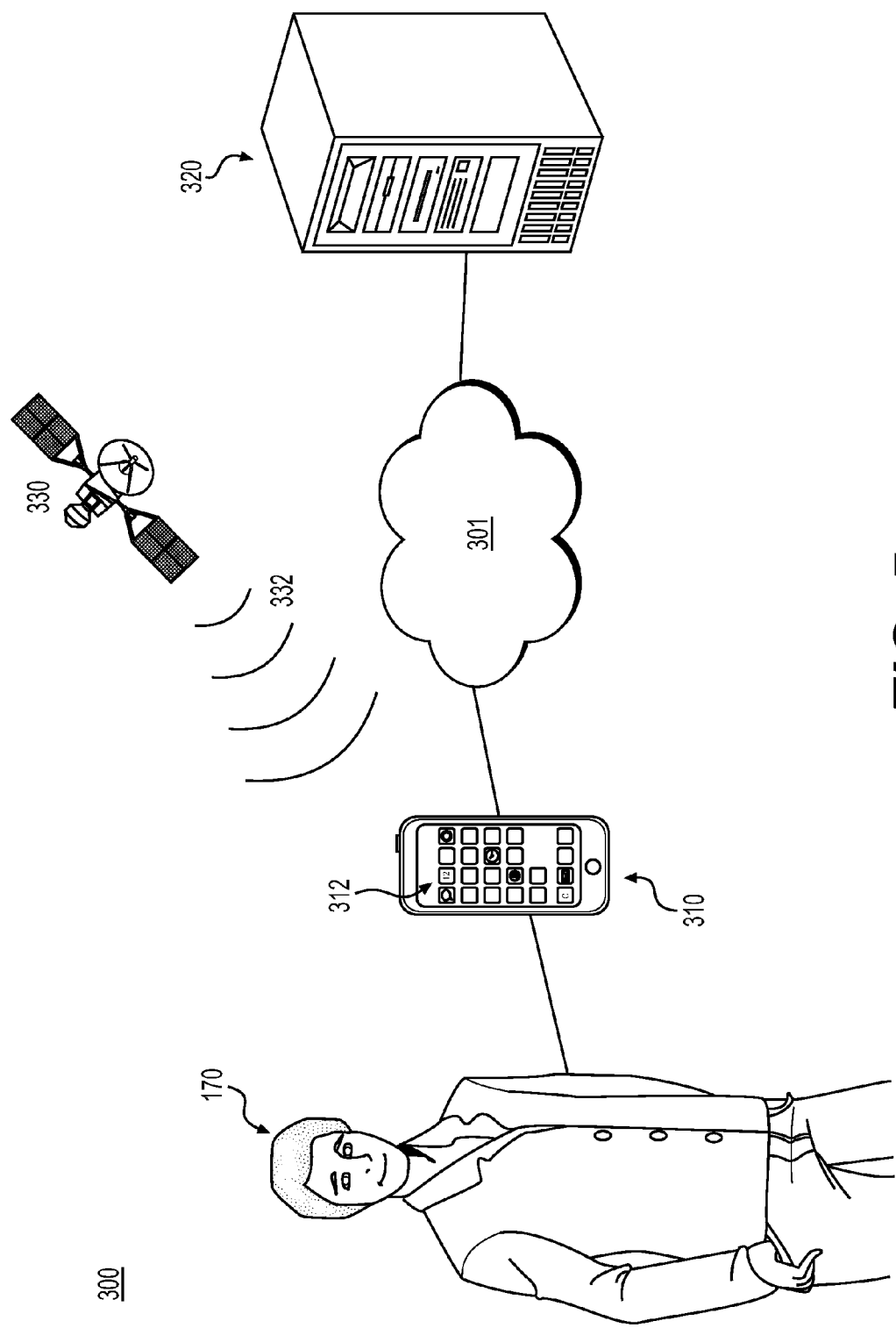
FIG. 5 is a diagram of a networked computing environment suitable for use with some implementations of the present technology.

Turning to FIG. 5, there is shown a networked computing environment 300 suitable for use with some implementations of the present technology, the networked computing environment 300 comprising a smartphone 310 (e.g. an Apple iPhone™ or a Samsung Galaxy S4™) with a touch screen display 312 for displaying information to user 170 and receiving touch screen commands from user 170, a mapping server 320 in communication with smartphone 310 via a communications network 301 (e.g. the Internet), and a GPS satellite 330 transmitting a GPS signal 332 to smartphone 310.

Along with touchscreen display 312, smartphone 310 also comprises internal hardware components including one or more single or multi-core processors collectively referred to herein as processor 110, and a random access memory 130, each of which is analogous to the like-numbered hardware components of computer system 100 shown in FIG. 1, as well as a network interface (not depicted) for communicating with the mapping server 320 via communications network 301 and a GPS receiver (not depicted) for receiving the GPS signal 332 from GPS satellite 330.

Figure 6:
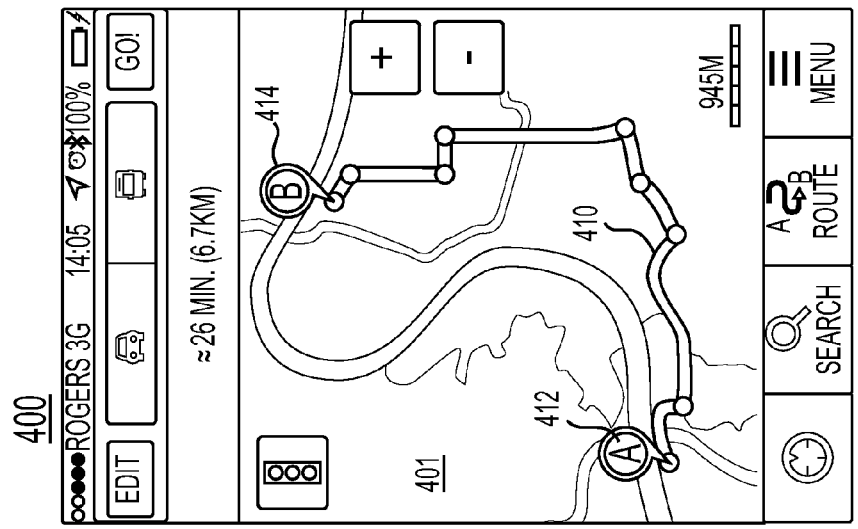

FIG. 6 shows a mapping application 400 running on processor 110 of the smartphone 310 of FIG. 5, as possibly displayed on its touchscreen display 312. The mapping application 400 displays a map 401 comprising a route 410 from a first position 412 to a second position 414. For example, program instructions of the mapping application 400, when executed by processor 110 of smartphone 310, may have caused the processor 110 to obtain a request, from user 170 via the touch screen display 312, to determine a route 410 from the first position 412 to the second position 414. As a result, processor 110 may have directed the network interface of smartphone 310 to obtain suitable mapping information from mapping server 320 via the communications network 301 of FIG. 5.

Figure 8:
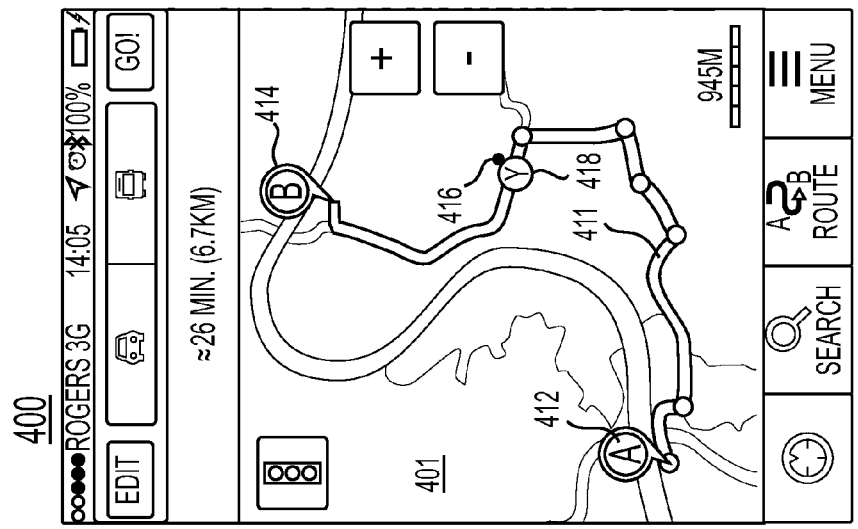
FIGS. 6 to 8 are screenshots of a mapping application illustrating an implementation of the present technology.
Figure 7:
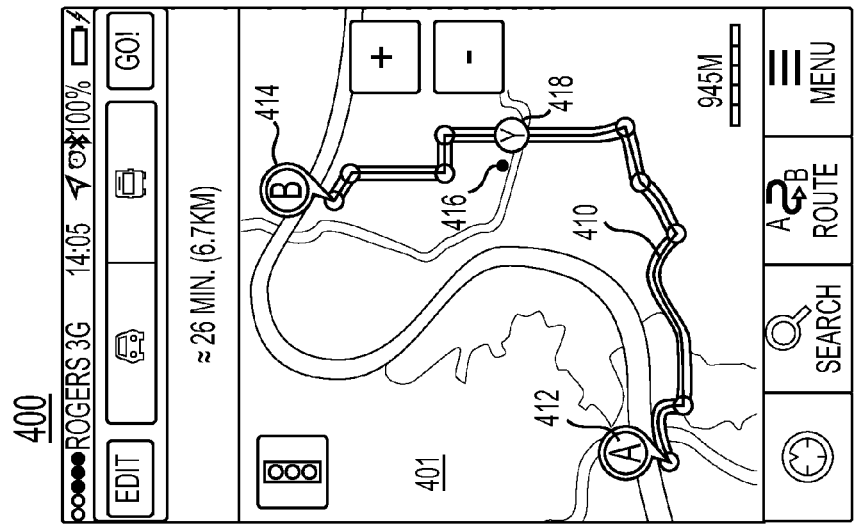

As depicted in FIG. 7 and FIG. 8, the program instructions of mapping application 400 may further cause the processor 110 to direct the GPS receiver of smartphone 310 to obtain a GPS position 416 of smartphone 310 by decoding the GPS signal 332 received from GPS satellite 330 of FIG. 5. For example, user 170 may be travelling along route 410 from the first position 412 to the second position 414 while carrying smartphone 310. Each of FIG. 7 and FIG. 8 represents a potential screenshot of the mapping application 400 as it may appear on the touch screen display 312 of smartphone 310, depending on whether the mapping application 400 has determined that the GPS position 416 of smartphone 310 is or is not along the route 410.

More specifically, FIG. 7 shows how map 401 may appear on touch screen display 312 if mapping application 400 has determined that a point representative of GPS position 416 is along a curve representative of route 410 in the multidimensional space of map 401. As depicted in FIG. 7, while the GPS position 416 does not strictly lie "on" the route 410, mapping application 400 may tolerate such a slight perceived deviation from route 410 and nevertheless deem GPS position 416 to lie "along" the route 410. For example, mapping application 400 may depict, on map 401, an estimated position 418 of smartphone 310 being a closest point to GPS position 416 on route 410, such depiction either complementing or substituting that of GPS position 416. In this manner, mapping application 400 may provide an indication to user 170 that it has deemed GPS position 416 to lie along route 410.

Such tolerance of deviations of the GPS position 416 from the route 410 may make sense in certain circumstances. For example, a designer of mapping application 400 may believe GPS positioning information to be inaccurate for various reasons (such as interference from buildings or clouds), casting doubt on the degree to which GPS position 416 truly represents the position of smartphone 310 (and user 170, by proxy). While a blind faith in the accuracy of GPS position 416 may suggest that user 170 has deviated from route 410, user 170 may still actually be on route 410. By allowing a certain margin of error, mapping application 400 may avoid such a false conclusion. Of course, a suitable degree of tolerance must be chosen with care so as to also avoid the converse pitfall of failing to detect when user 170 has in fact left route 410.

FIG. 8 shows how map 401 may appear on touch screen display 312 of smartphone 310 if mapping application 400 has determined that GPS position 416 really does not lie along route 410. In such case, mapping application 400 may deem smartphone 310 to be located at an estimated position 418 on a road which is not part of route 410, such as a closest road to GPS position 416 on map 401. In such a circumstance, mapping application 400 may conclude that user 170 has deviated from route 410 to such a degree that is necessary to obtain a new route 411 from the first position 412 to the second position 414, the new route 411 passing through the estimated position 418. As such, mapping application 400 may communicate with mapping server 320 of FIG. 5 via communications network 301 to obtain the new route 411. Mapping application 400 may then display route 411 as part of map 401, perhaps along with an indication of one (or both, as in FIG. 8) of GPS position 416 and estimated position 418.

Having described, with reference to FIG. 1 to FIG. 8, some non-limiting example instances of the problem of determining whether a point lies along a curve in a multi-dimensional space, we shall now describe a general solution to this problem with reference to FIG. 9 to FIG. 20. More specifically, in FIG. 9 to FIG. 13, a curve 500 connecting two points 501 and 502 will be characterized by identifying regions each encompassing a respective portion of the curve 500 as part of a process of generating a second curve approximating the curve 500 according to an implementation of the well-known Ramer-Douglas-Peucker (RDP) algorithm. Then, in FIG. 14 to FIG. 20, a curve forming a periphery of a polygon will be characterized by identifying regions each encompassing a respective portion of the curve as part of a process of generating an approximation of the curve according to another implementation of the RDP algorithm.

Figure 9:
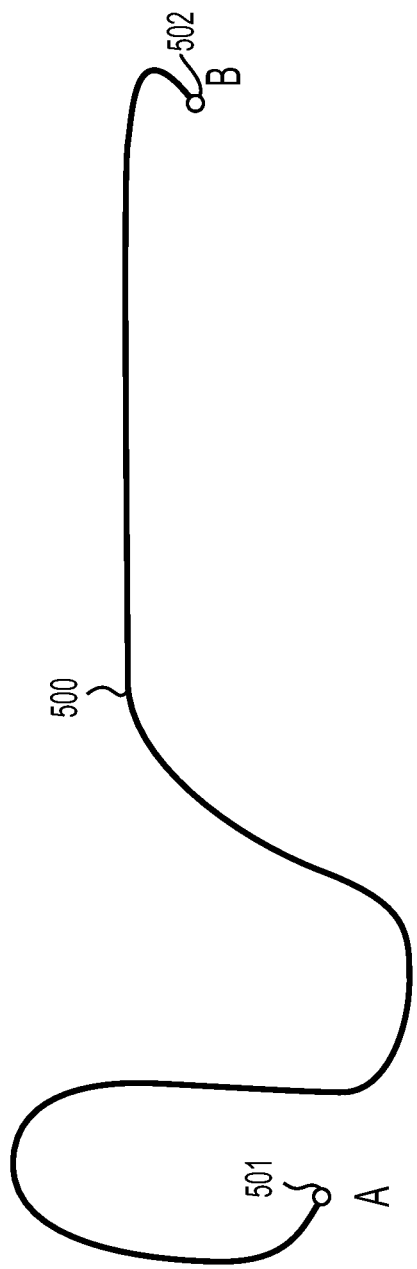
FIGS. 9 to 13 are diagrams illustrating a process of identifying regions encompassing respective portions of a curve while iteratively generating a second curve approximating the curve according to an implementation of the present technology.

FIG. 9 shows a two-dimensional curve 500 to be characterized, the curve 500 connecting a first point 501 ("A") to a second point 502 ("B"). Curve 500 may be considered to represent, in a general form, a curve used in a more specific application, non-limiting examples of which are the stock price line 202 of the stock charting application 200 shown in FIG. 2 to FIG. 4, as well as the routes 410 and 411 of the mapping application 400 shown in FIG. 6 to FIG. 8.

Figure 10:
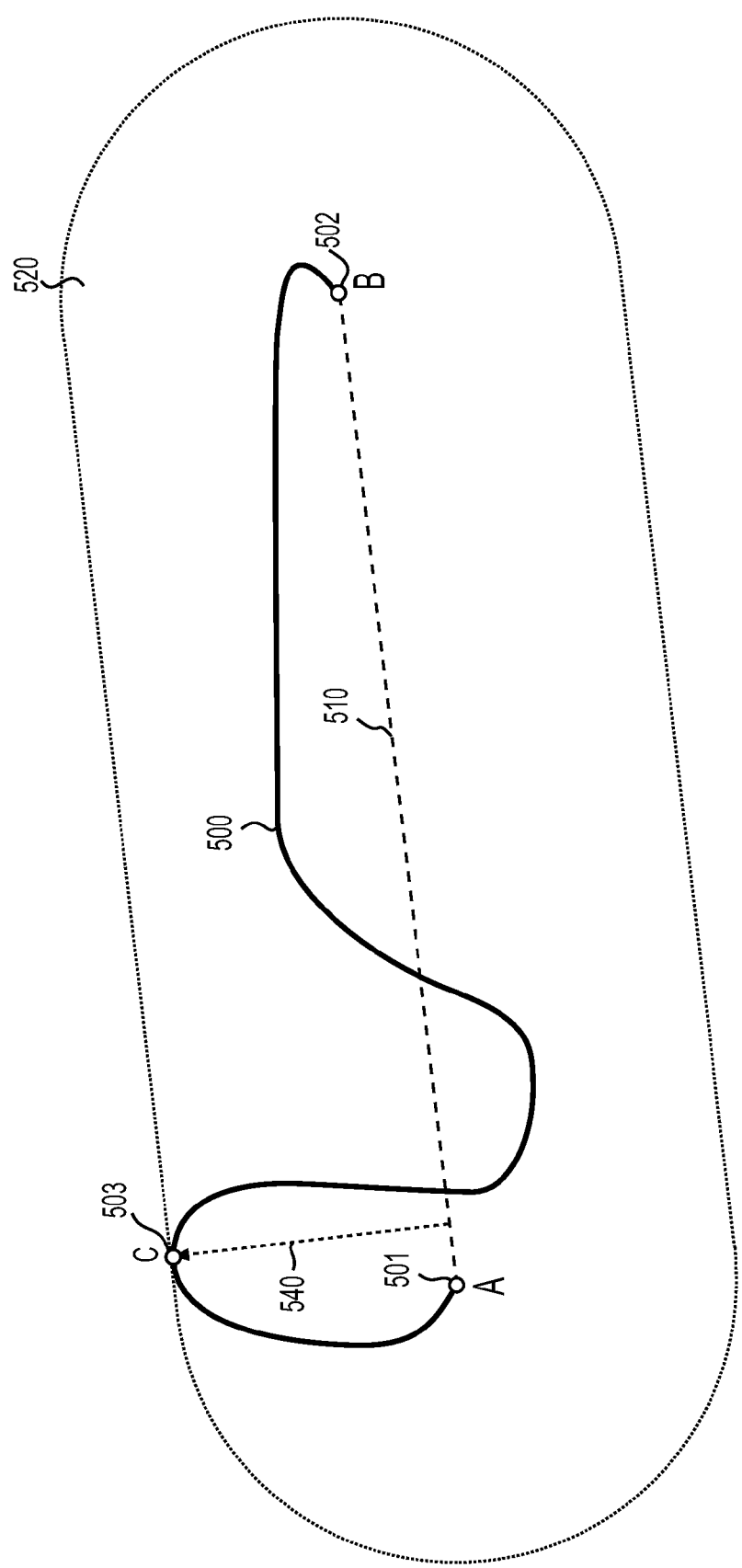

FIG. 10 shows a second curve comprising a single line segment 510 which connects point 501 to point 502 provides a first approximation of the curve 500. A most distant point 503 ("C") from the line segment 510 on the curve 500 defines a boundary distance of a region 520 which encompasses the curve 500. Region 520 consists of all points no more distant than point 503 (the most distant point from the line segment 510 lying on curve 510 between point 501 and point 502) from the line segment 503.

Because the multidimensional space is two-dimensional, the region 520 is a two-dimensional region (an area). Because this version of the second curve has only one line segment 510, it is encompassed by a set of regions having just one member: region 520. At this point, the RDP algorithm may continue approximation of the curve 500 because the boundary distance of the region 520 may be greater than a threshold value, perhaps defined as a number of pixels or a physical distance on display 142.

Figure 11:
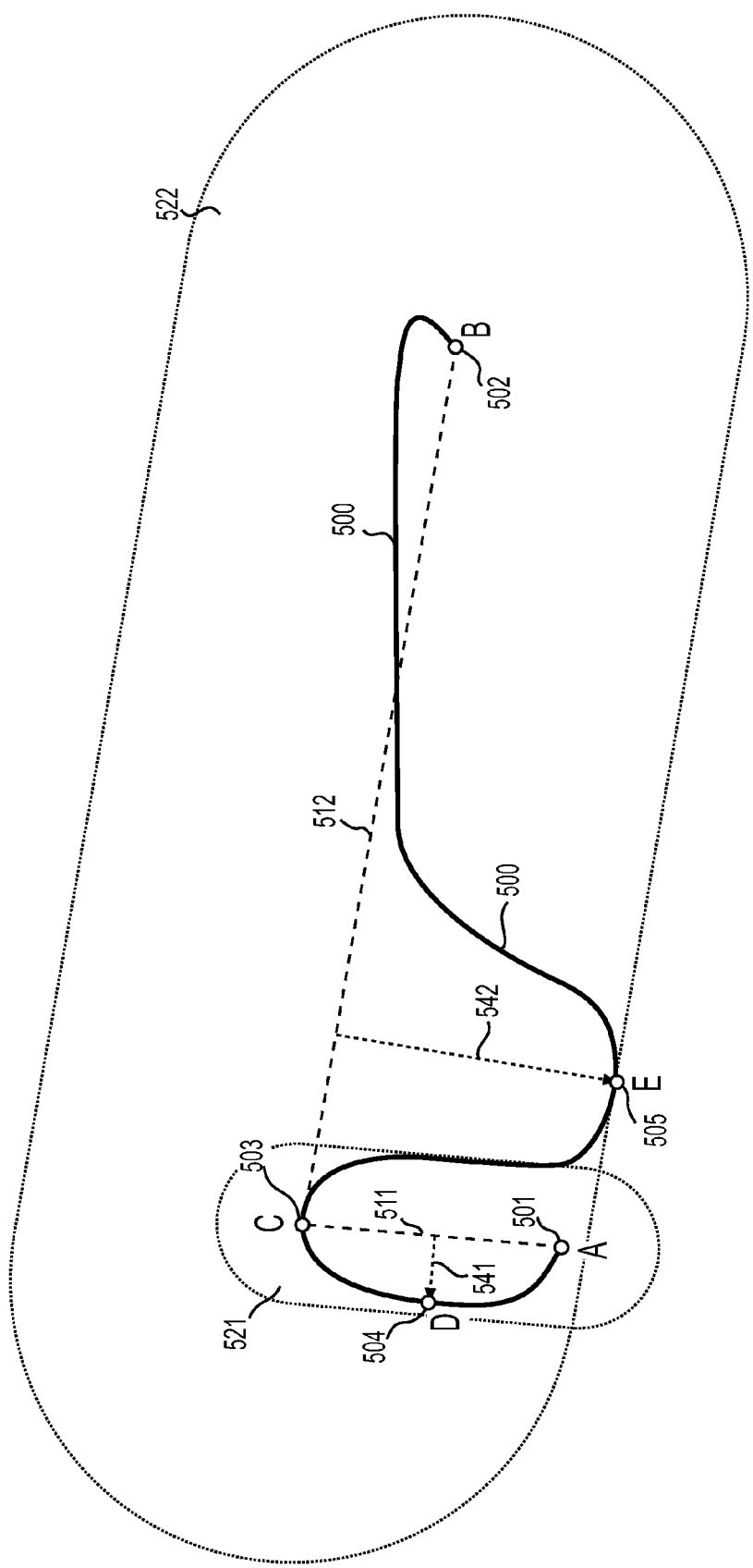

FIG. 11 shows an evolution of the second curve, relative to that shown in FIG. 10, according to an implementation of the RDP algorithm. The single line segment 510 of FIG. 10 has been replaced by two line segments 511 and 512, line segment 511 connecting the point 501 ("A") to the point 503 ("C") which had been identified as the most distant point from the line segment 510, and line segment 512 connecting the point 503 ("C") to the point 502 ("B").

A most distant point 504 ("D") from the line segment 511 on the curve 500 between point 501 ("A") and point 503 ("C") defines a boundary distance 541 of a region 521 which encompasses a portion of the curve 500 including that portion of the curve 500 which lies between point 501 ("A") and point 503 ("C"). A most distant point 505 ("E") from the line segment 512 on the curve 500 between point 503 ("C") and point 502 ("B") defines a boundary distance 542 of a region 522 which encompasses a portion of the curve 500 including that portion of the curve 500 which lies between point 503 ("C") and point 502 ("B").

Because this version of the second curve has two line segments 511 and 512, it is encompassed by a set of regions having two members: region 521 and region 522. At this point, the RDP algorithm may continue approximation of the curve 500 because the boundary distance (541, 542) of at least one of the regions (521, 522) in the set of regions may be greater than the threshold value.

Figure 12:
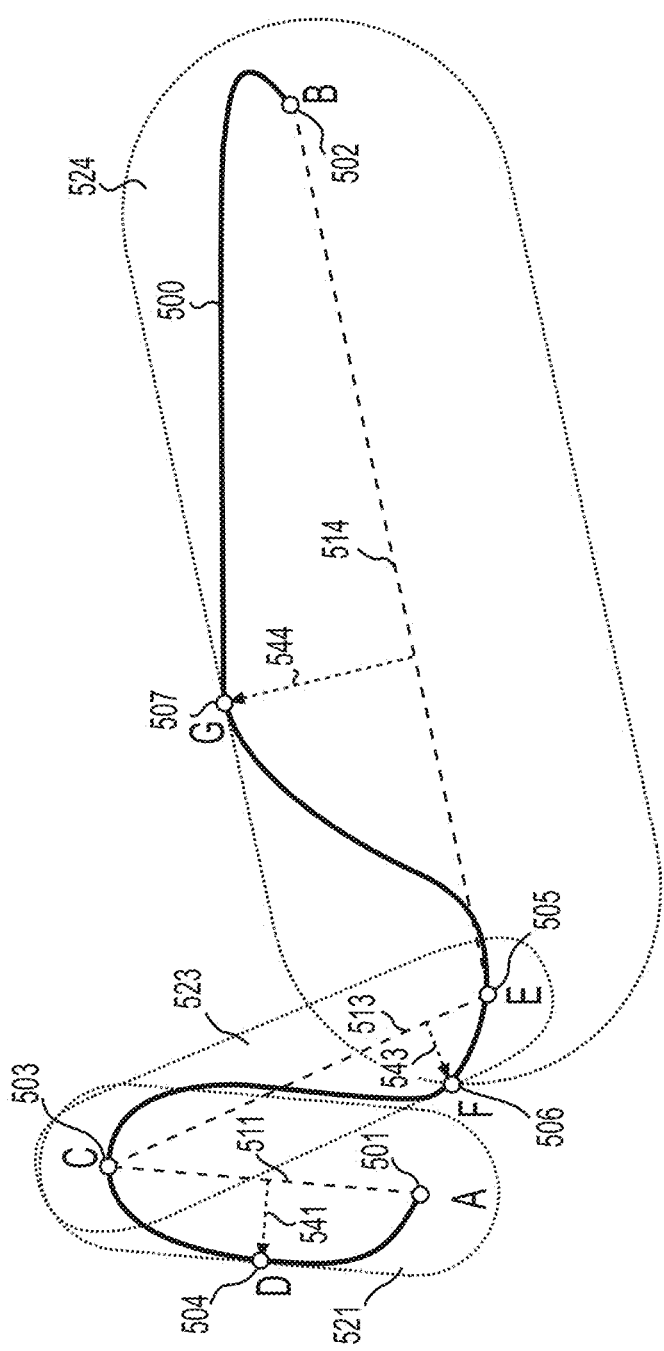

FIG. 12 shows a further evolution of the second curve relative to that shown in FIG. 11 after another iteration of an implementation of the RDP algorithm. The second curve approximating curve 500 now consists of three line segments 511, 513, and 514. Line segment 512 of FIG. 11 has been replaced by the line segments 513 and 514, line segment 513 connecting point 503 ("C") to point 505 ("E") which had been identified as the most distant point from the line segment 512, and line segment 514 connecting point 505 ("E") to point 502 ("B").

Line segment 511 remains part of the second curve because, according to this implementation of the RDP algorithm, the boundary distance from line segment 511 to point 504 ("D") is sufficiently small to halt further approximation of the portion of curve 500 lying between point 501 ("A") and point 503 ("C"). A most distant point 506 ("F") from the line segment 513 on the curve 500 between point 503 ("C") and point 505 ("E") defines a boundary distance 543 of a region 523 which encompasses a portion of the curve 500 including that portion of the curve 500 which lies between point 503 ("C") and point 505 ("E").

A most distant point 507 ("G") from the line segment 514 on the curve 500 between point 505 ("E") and point 502 ("B") defines a boundary distance 544 of a region 524 which encompasses a portion of the curve 500 including that portion of the curve 500 which lies between point 505 ("E") and point 502 ("B"). Because this version of the second curve has three line segments 511, 512 and 513, it is encompassed by a set of regions having three members: region 521, region 523, and region 524. At this point, the RDP algorithm may continue approximation of the curve 500 because the boundary distance (541, 543, 544) of at least one of the regions (521, 523, 524) in the set of regions may be greater than the threshold value.

Figure 13:
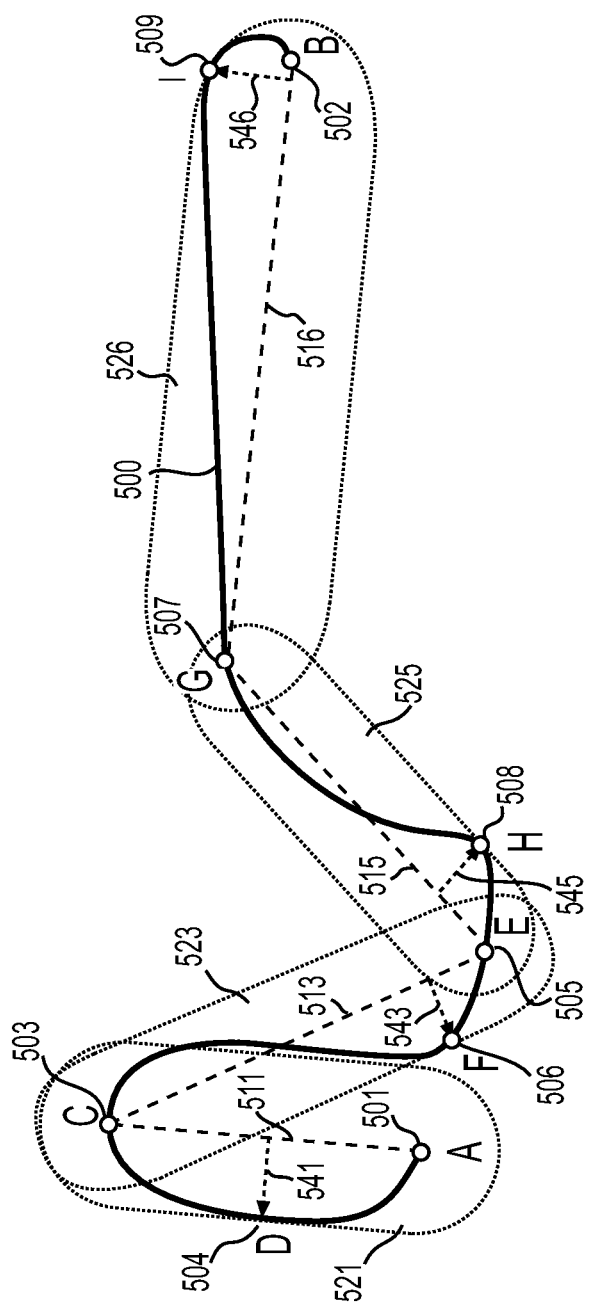

FIG. 13 shows a yet further evolution of the second curve relative to that shown in FIG. 12 after another iteration of an implementation of the RDP algorithm. The second curve approximating curve 500 now consists of four line segments 511, 513, 515, and 516. Line segment 514 of FIG. 12 has been replaced by the line segments 515 and 516, line segment 515 connecting point 505 ("E") to point 507 ("G") which had been identified as the most distant point from the line segment 514, and line segment 516 connecting point 507 ("G") to point 502 ("B").

Line segments 511 and 513 remain part of the second curve because, according to this implementation of the RDP algorithm, the boundary distances of regions 521 and 523, respectively, are sufficiently small to halt further approximation of the portions of curve 500 lying between point 501 ("A") and point 503 ("C") and between point 503 ("C") and point 505 ("E"). A most distant point 508 ("H") from the line segment 515 on the curve 500 between point 505 ("E") and point 507 ("G") defines a boundary distance 545 of a region 525 which encompasses a portion of the curve 500 including that portion of the curve 500 which lies between point 505 ("E") and point 507 ("G").

A most distant point 509 ("I") from the line segment 516 on the curve 500 between point 507 ("G") and point 502 ("B") defines a boundary distance 546 of a region 526 which encompasses a portion of the curve 500 including that portion of the curve 500 which lies between point 507 ("G") and point 502 ("B"). Because this version of the second curve has four line segments 511, 513, 515 and 516, it is encompassed by a set of regions having four members: region 521, region 523, region 525, and region 526. At this point, the RDP algorithm may halt further approximation of the curve 500 because the boundary distances (541, 543, 545, 546) of the regions 521, 523, 525, and 526 may finally all be less than the threshold value.

Figure 14:
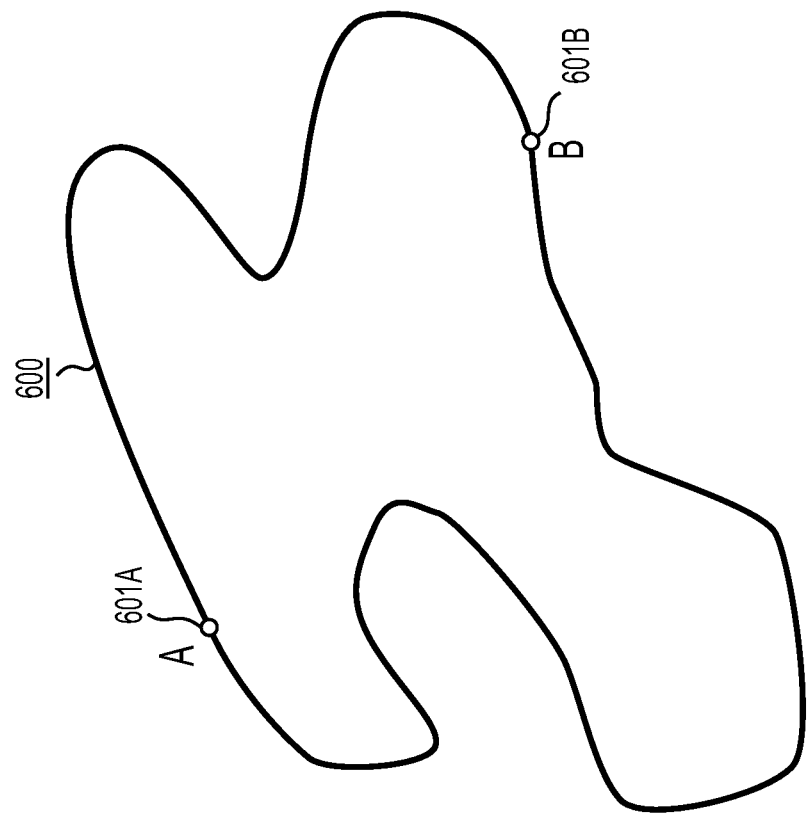
FIGS. 14 to 20 are diagrams illustrating a process of identifying regions encompassing respective portions of a curve (forming a periphery of a polygon) while iteratively generating a second curve approximating the curve according to another implementation of the present technology.

With reference now to FIG. 14, there is shown a two-dimensional curve 600 forming a periphery of a polygon by looping from a point 601A to a point 601B and back to point 601A, the curve 600 to be characterized according to a second exemplary implementation of the present technology.

Figure 15:
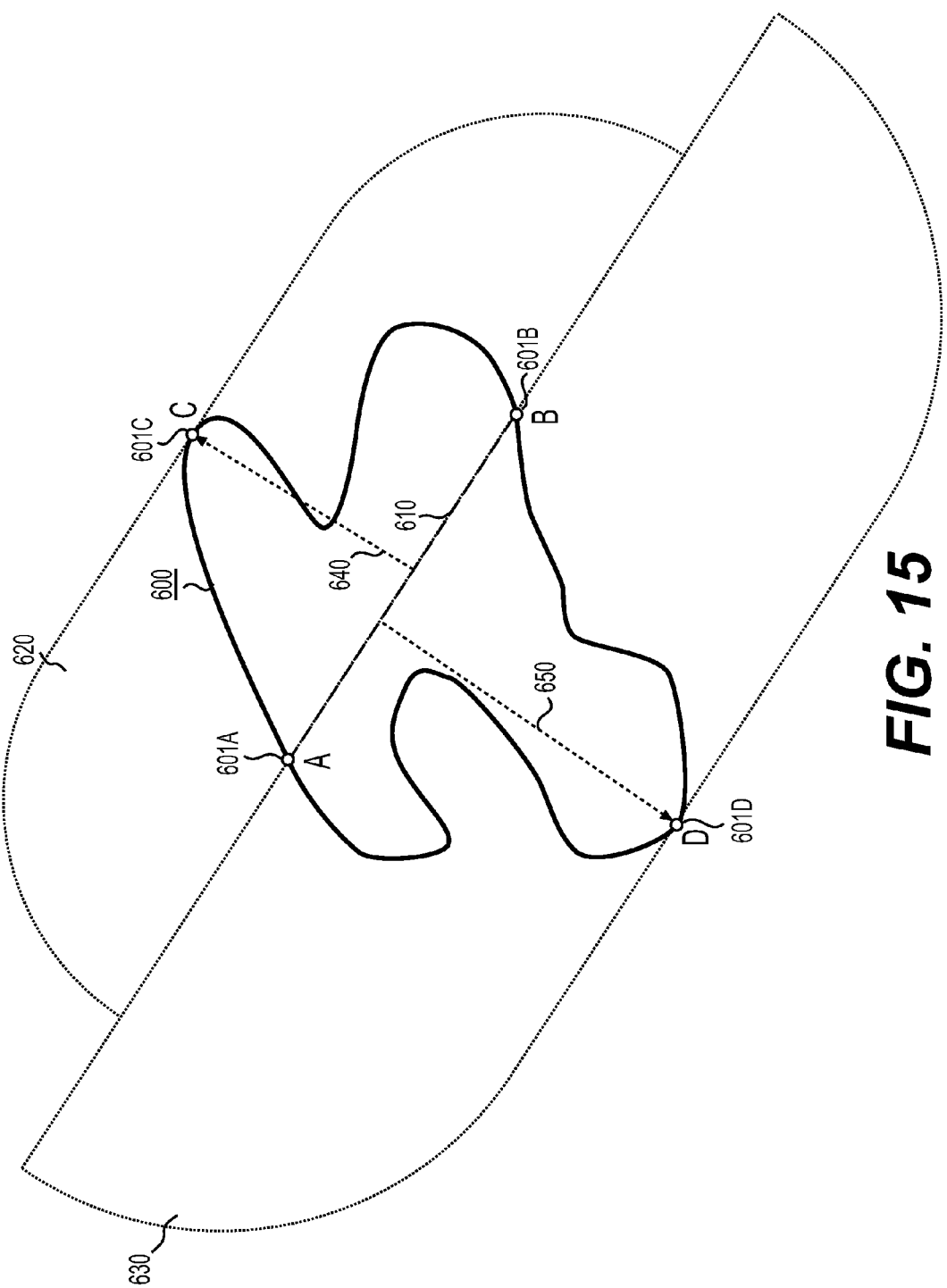

In FIG. 15, a second curve consisting of a single line segment 610 serves as a first approximation of the curve 600. According to this implementation of the present technology, each line segment of the second curve (e.g. line segment 610) is encompassed by an identified region being an area consisting of two component areas each defined by a respective boundary distance to a most distant point away from a respective side of the line segment.

For example, as presented in FIG. 15, an area consisting of the component areas 620 and 630 encompasses line segment 610 of the second curve. A most distant point 601C from a first side of the line segment 610 on the curve 600 between point 601A and point 601B defines a first boundary distance 640 of the component region 620, and a most distant point 601D from a second side of the line segment 610 on the curve 600 between point 601B and point 601A defines a boundary distance 650 of the component region 630.

Thus, in the implementation of the present technology shown in FIG. 15 (as well as FIG. 16 to FIG. 20), each region is defined by two boundary distances, one in each opposing direction away from a respective side of a line segment of the second curve. As those skilled in the art will understand, this type of region (area in the two-dimensional case) is merely one variation of that presented above with reference to FIG. 9 to FIG. 13, where each region was defined by a single boundary distance to a most distant point from a respective line segment of the second curve. Other types of regions may also be used in various implementation of the present technology.

Figure 16:
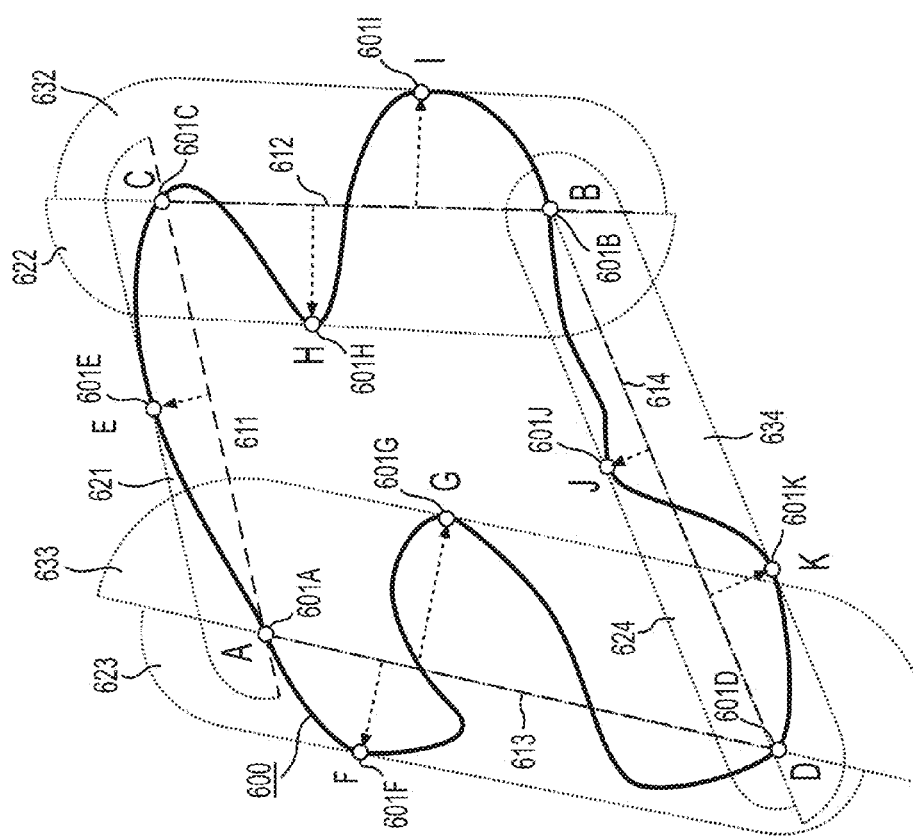

FIG. 16 shows an evolution of the second curve relative to that shown in FIG. 15, according to an implementation of the RDP algorithm. The single line segment 610 of FIG. 11 has been replaced by four line segments 611 to 614, line segment 611 connecting the point 601A to the point 601C which had been identified as the most distant point from a first side of the line segment 610, line segment 612 connecting the point 601C to the point 601B, line segment 613 connecting the point 601A to the point 601D which had been identified as the most distant point from a second side of the line segment 610, and line segment 614 connecting the point 601D to the point 601B.

As in FIG. 15, each one of the line segments 611 to 614 of the generated second curve is encompassed by a respective region defined as an area consisting of two component areas, each of the component areas being defined in turn by a respective boundary distance of a most distant point on a respective portion of the curve 600 away from one side of the corresponding line segment (one of 611 to 614) approximating that portion of the curve 600.

Thus, line segment 612 is encompassed by an area consisting of an area 622 defined by a first boundary distance from line segment 612 to a most distant point 601H away from a first side of line segment 612 and an area 632 defined by a second boundary distance from the line segment 612 to a most distant point 601I away from a second side of line segment 612; line segment 613 is encompassed by an area consisting of an area 623 defined by a first boundary distance from line segment 613 to a most distant point 601F away from a first side of line segment 613 and an area 633 defined by a second boundary distance from the line segment 613 to a most distant point 601G away from a second side of line segment 613; and line segment 614 is encompassed by an area consisting of an area 624 defined by a first boundary distance from line segment 614 to a most distant point 601J away from a first side of line segment 614 and an area 634 defined by a second boundary distance from the line segment 614 to a most distant point 601K away from a second side of line segment 614.

The region encompassing line segment 611 presents a special case wherein the boundary distance away from one side of the line segment 611 is zero because no portion of the curve 600 between point 601A and point 601C lies to that side of the line segment 611. As such the region encompassing line segment 611 is an area consisting of a first component area 621 defined by a first boundary distance from line segment 611 to a most distant point 601E away from a first side of line segment 611 and a null area corresponding to the zero boundary distance of the second side of line segment 611.

According to the present example implementation of the RDP algorithm, generation of the second curve approximating curve 600 may halt after just one iteration because it may be determined that none of the regions in the set of regions shown in FIG. 16 has a greatest boundary distance (the greater of the first boundary distance and the second boundary distance) that is greater than a threshold value. The final version of the second curve may therefore be that consisting of line segments 611 to 614 as shown in FIG. 16.

Figure 17:
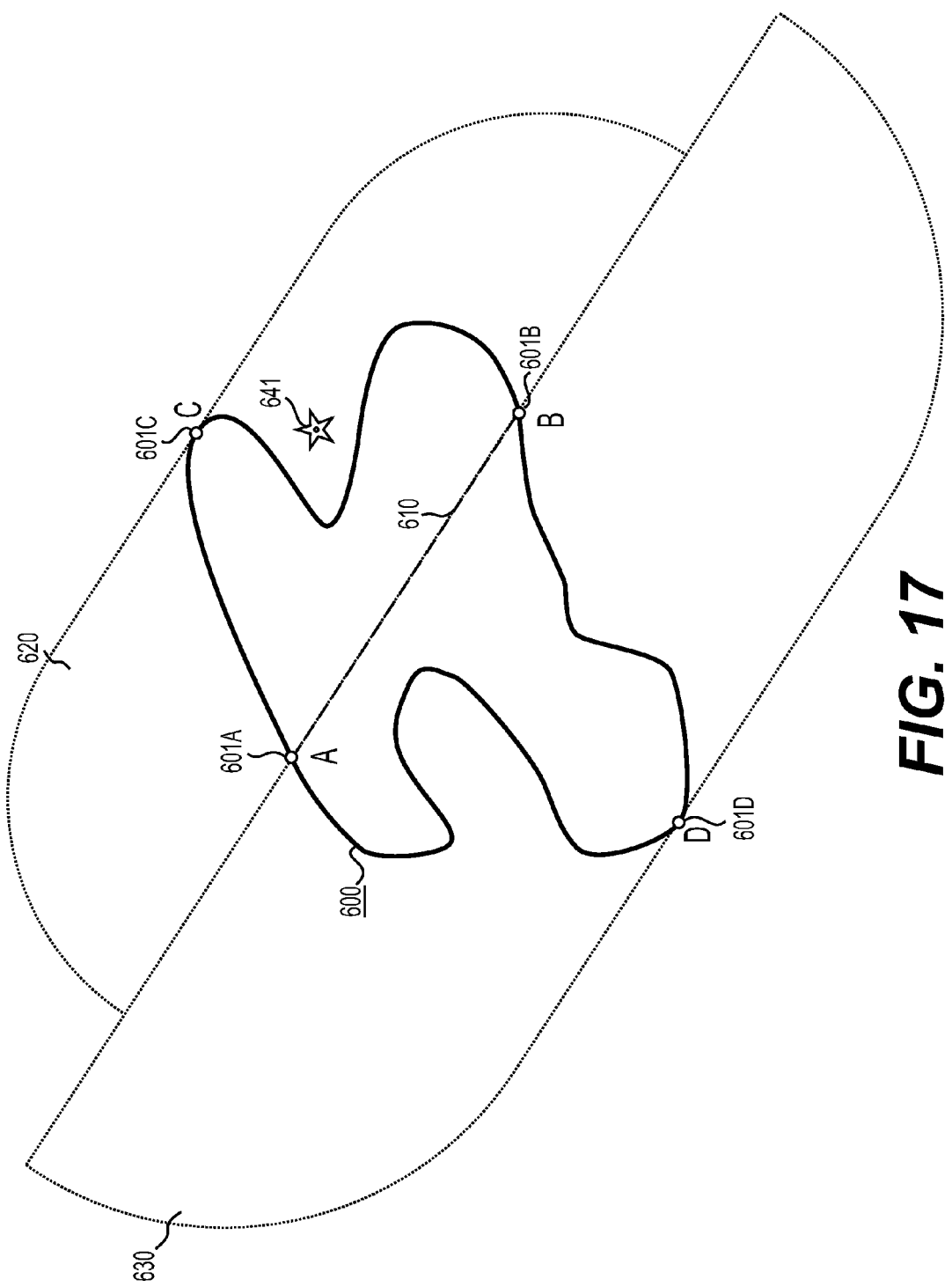

Turning to FIG. 17, curve 600 is shown again as it appeared in FIG. 15, with a second curve being a first approximation of curve 600 consisting of just one segment 610 connecting point 601A to point 601B, the line segment 610 being encompassed by an area consisting of component areas 620 and 630 each defined by a respective boundary distance to a respective most distant point 601C, 601D, away from a respective side of line segment 611. In addition, a hit point 641 is depicted next to the curve 600.

Hit point 641 represents a general case of a point which may or may not be determined to lie "along" a curve 600. In more specific applications such as the stock charting application 200 (FIG. 2) or the mapping application 400 (FIG. 6), the hit point 641 may be, as non-limiting examples, a click point 206 next to a stock price line 202 or a GPS position 416 next to a route 410.

According to implementations of the present technology, a first determination of whether the hit point 641 lies along the curve 600 may be made by analyzing region coordinates of the region encompassing the line segment 610 (i.e. the area consisting of component areas 620 and 630) to determine whether the hit point 641 lies within it. As depicted in FIG. 17, the hit point 641 does indeed lie within the component area 620 of the region.

This suggests that the hit point 641 may lie along the curve 600; however, a conclusive determination may depend on an evaluation of the boundary distance of the region consisting of areas 620 and 630, and more specifically of whether or not that boundary distance is small enough to infer that any point lying within that region may be deemed to lie along the curve 600. In some implementations, the boundary distance of the regions may already be implicitly known to be sufficiently small by virtue of the manner in which the regions were identified during generation of the second curve.

For example, if the regions were identified via execution of an RDP algorithm as described above with reference to FIG. 13 to FIG. 16, it may be known that the threshold value based on which the RDP algorithm was halted is sufficiently small to indicate that any point lying within the set of regions encompassing the final version of the second curve (e.g. the regions shown in FIG. 16) may be deemed to lie along the curve 600. In other implementations, the boundary distance of the region within which the hit point 641 lies may be explicitly tested against a threshold value.

Figure 18:
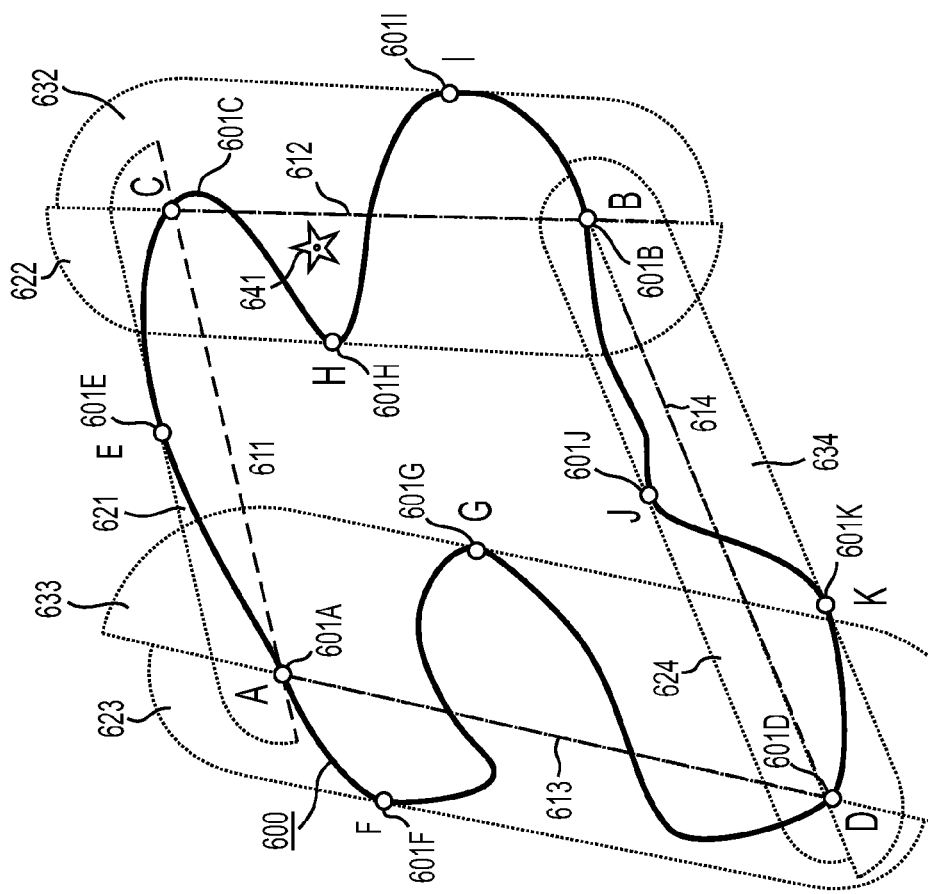
Figure 19:
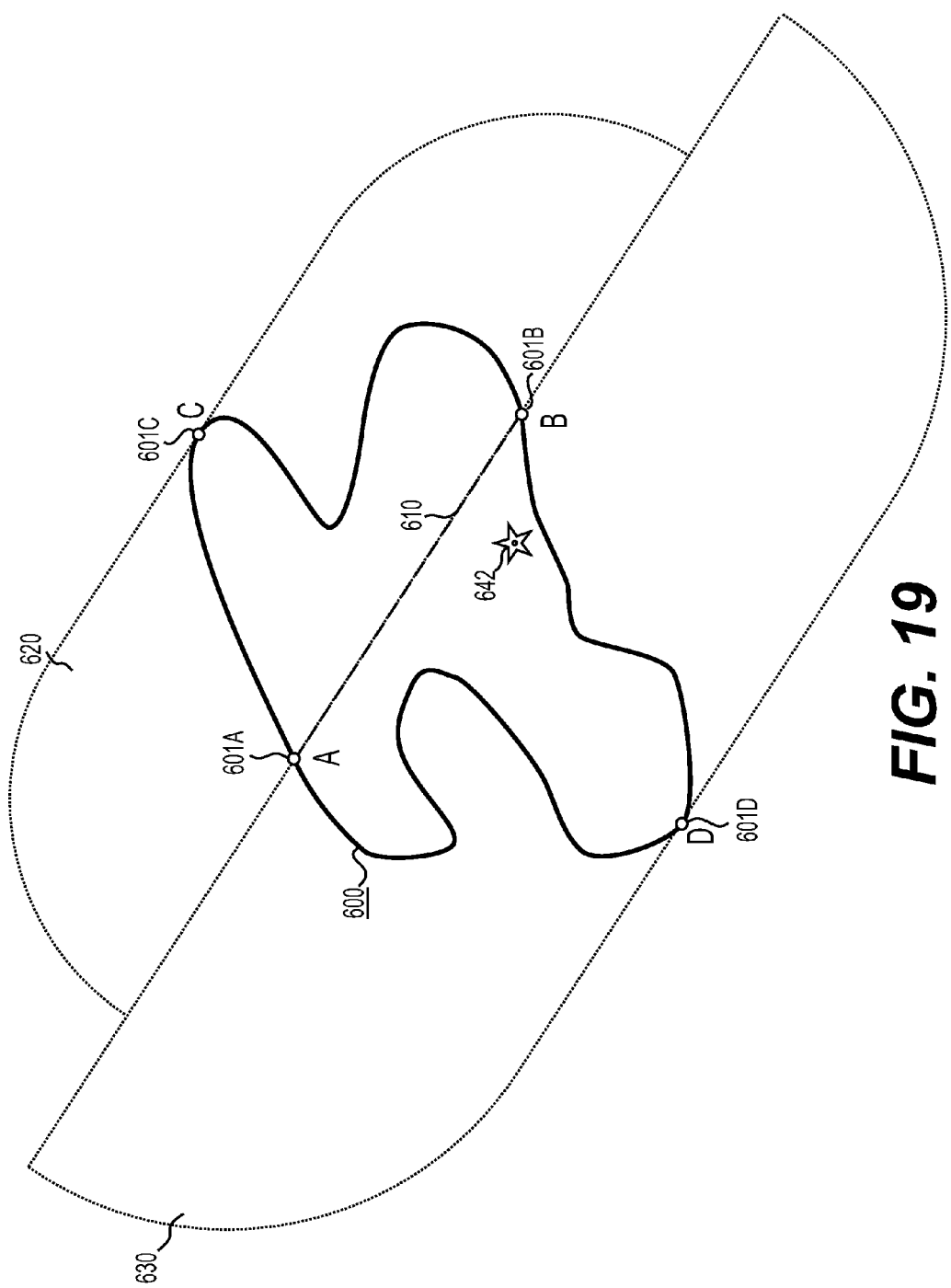

If the boundary distance is no greater than the threshold value, it may be concluded that the hit point 641 does lie along the curve 600. However, if the boundary distance is greater than the threshold value, further evaluation may be performed to determine whether the hit point 641 lies within another region encompassing a more fleshed out approximation of the curve 600, such as one of the areas 621, 622, 632, 623, 633, 624, and/or 634 of FIG. 18. As depicted in FIG. 18, hit point 641 does in fact lie inside the area 622 of the region encompassing line segment 612. If the boundary distance of the area 622 is no greater than the threshold value, it may be concluded that the hit point 641 does indeed lie along the curve 600.

With reference now to FIG. 19, curve 600 is once again shown as it appeared in FIG. 15, but with the addition of a second hit point 642 which may or may not be determined to lie along curve 600. As above, a first determination of whether the hit point 642 lies along the curve 600 may be made by analyzing region coordinates of the region encompassing the line segment 610 (i.e. the area consisting of component areas 620 and 630) to determine that hit point 642 lies within the region (component area 620, specifically).

In some implementations, if there is a set of regions associated with a more fleshed out approximation of the curve 600, an evaluation of whether the hit point 642 lies within one of the members of that set of regions is performed automatically. In other implementations, as above with reference to FIG. 17, this evaluation occurs only after testing whether a boundary distance of the region within which the hit point 642 has been found to lie is no greater than a threshold value and therefore that a determination that the hit point 642 lies along the curve 600 may already be made.

Figure 20:
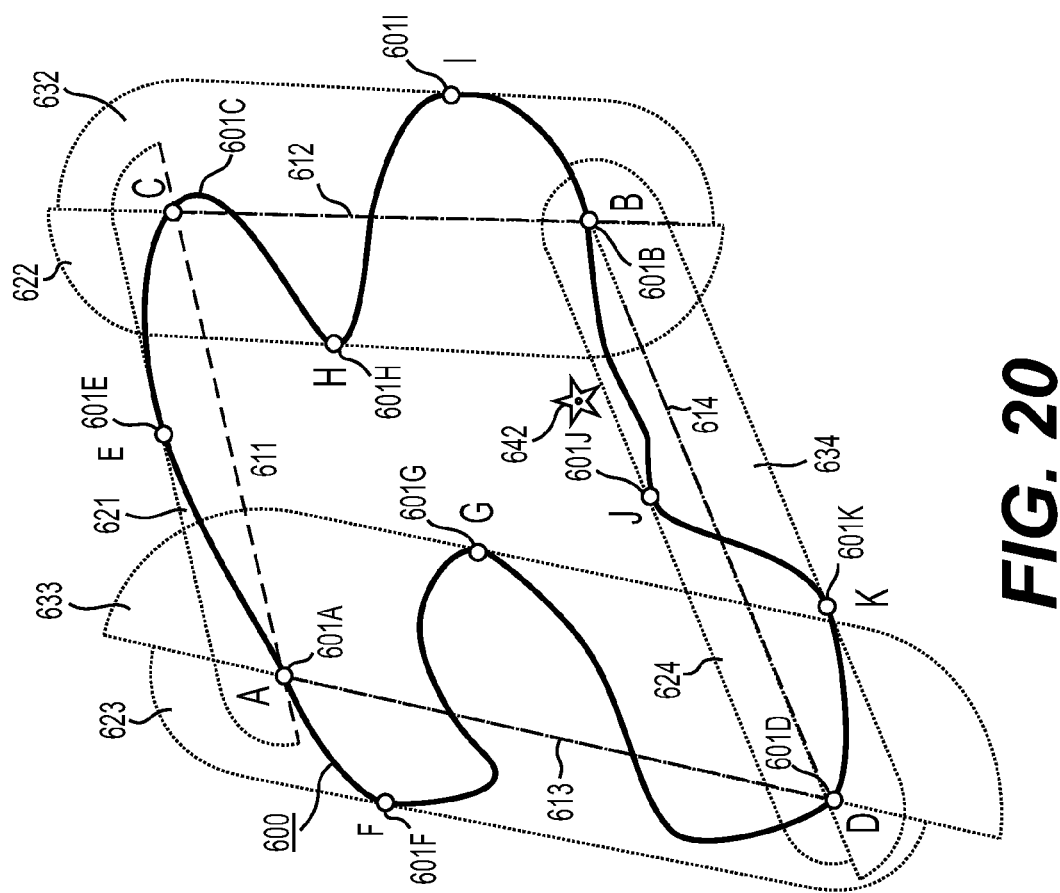

FIG. 20 shows a more fleshed out approximation of the curve 600. Hit point 642 does not lie inside any of the regions 621, 622, 632, 623, 633, 624, or 634 that make up the set of regions encompassing the version of the second curve depicted. In some implementations of the present technology, the fact that the hit point 642 lies outside of all of the regions in the set of regions associated with a version of the second curve may be sufficient to conclude that the hit point 642 does not lie along the curve 600.

This may be the case, for example, if a smallest boundary distance of any one of the regions is known to be greater than a threshold value, which may be the case, for example, if the regions were identified while generating a second curve according to an RDP algorithm (as above, with reference to FIG. 14 to FIG. 16) in which the boundary distance of the regions was compared to a threshold value when determining when to halt execution. In other implementations, the boundary distance of each of the regions in the set of regions may be compared to a threshold value, and if the boundary distance of each of the regions is greater than the threshold value, it may be determined that the hit point 642 lies too far from the line segment 614 and, by proxy, too far from curve 600 to be judged to lie "along" curve 600.

Figure 21:
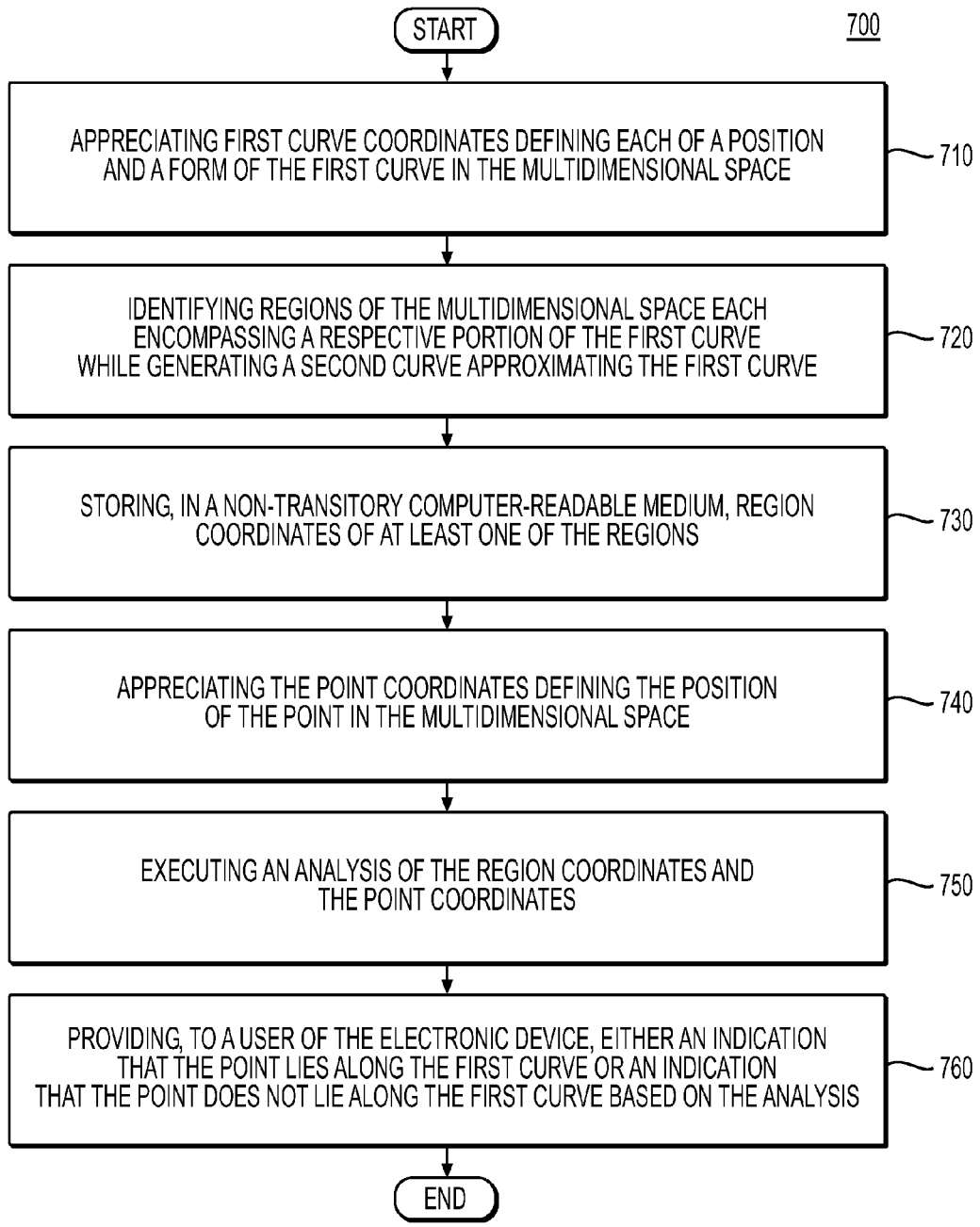
FIGS. 21 and 22 are flowcharts illustrating the respective steps of two method implementations of the present technology.

With reference now to FIG. 21, a flowchart corresponding to an exemplary method implementation of the present technology is shown. More specifically, FIG. 21 shows a computer-implemented method 700 for determining whether a point lies along a first curve in a multidimensional space, the method executable by a processor of an electronic device. Method 700 may be carried out, for example, in the context of the computer system 100 of FIG. 1 or in the context of the smartphone 310 of FIG. 5 by a processor 110 executing program instructions having been loaded into the random access memory 130 from the solid-state drive 120.

At step 710, first curve coordinates defining each of a position and a form of the first curve in the multidimensional space are appreciated. At step 720, regions of the multidimensional space, each encompassing a respective portion of the first curve, are identified while generating a second curve approximating the first curve. In some implementations, identifying the regions comprises identifying a set of regions associated with each of a series of versions of the second curve.

For example, the second curve may be a polygonal chain of line segments connecting vertices each lying on the first curve, and each region may encompass a portion of the first curve lying between two adjacent vertices of the second curve, such that, in the aggregate, the set of regions associated with each version of the second curve encompasses the entire first curve.

Thus, in some implementations, step 720 comprises identifying a first set of the regions while generating a first version of the second curve, the first version of the second curve being a first polygonal chain; and identifying a second set of the regions while generating a second version of the second curve, the second version of the second curve being a second polygonal chain having more line segments than the first polygonal chain. For example, the second version of the second curve may be generated because at least one member of the first set of the regions has a boundary distance greater than a threshold value, suggesting a need to generate a better approximation of the first curve. It may then be determined that none of the regions in the second set of regions has a greater boundary distance than the threshold value, suggesting that the second version of the second curve is sufficiently accurate.

In some cases, however, a third, fourth, fifth, etc., version of the second curve may be generated, until no members of the set of regions associated with a version of the second curve has a boundary distance greater than the threshold value. For example, the second curve approximating the first curve may be generated recursively or iteratively by executing a Ramer-Douglas-Peucker algorithm such as that described with reference to the above figures.

At step 730, region coordinates of at least one of the regions are stored in a non-transitory computer-readable medium (examples of which include the random access memory 130 and the solid-state drive 120 of computer system 100). An analysis of the region coordinates and point coordinates defining a position of the point in the multidimensional space may then be executed to provide to a user either an indication that the point lies along the first curve or an indication that the point does not lie along the first curve.

This analysis may be performed by the same processor 110 of the same electronic device (e.g. computer system 100 or smartphone 310) that identified the regions encompassing respective portions of the first curve, or it may be performed by an altogether different processor of a different electronic device having obtained the region coordinates of the regions from the processor 110 of the electronic device, for example via a communications network (e.g. communications network 301).

Thus, in some cases, method 700 may further comprise steps 740, 750, and 760. At step 740, the point coordinates defining the position of the point in the multidimensional space are appreciated. Referring to the non-limiting examples of the stock charting application 200 and the mapping application 400, the appreciation of the point coordinates may refer to receiving coordinates of the click point 206 of the mouse 152 on the stock charting application 200 or to receiving coordinates of the GPS position 416. At step 750, the analysis of the region coordinates and the point coordinates is executed.

For example, the analysis may include evaluating whether the point lies either inside or outside one or more of the regions. At step 760, either an indication that the point lies along the first curve or an indication that the point does not lie along the first curve is provided to a user of the electronic device based on the analysis. For example, with reference to the stock charting application 200, a pop-up with further information 208 may serve as an indication to a user 170 of the stock charting application having clicked on a click point 206 that the click point 206 has been determined to lie along the stock price line 202. As a further example with reference to the mapping application 400, an indication that the GPS position 416 does not lie along the route 410 may be provided to the user 170 by displaying a new route 411 on the map 401.

Figure 22:
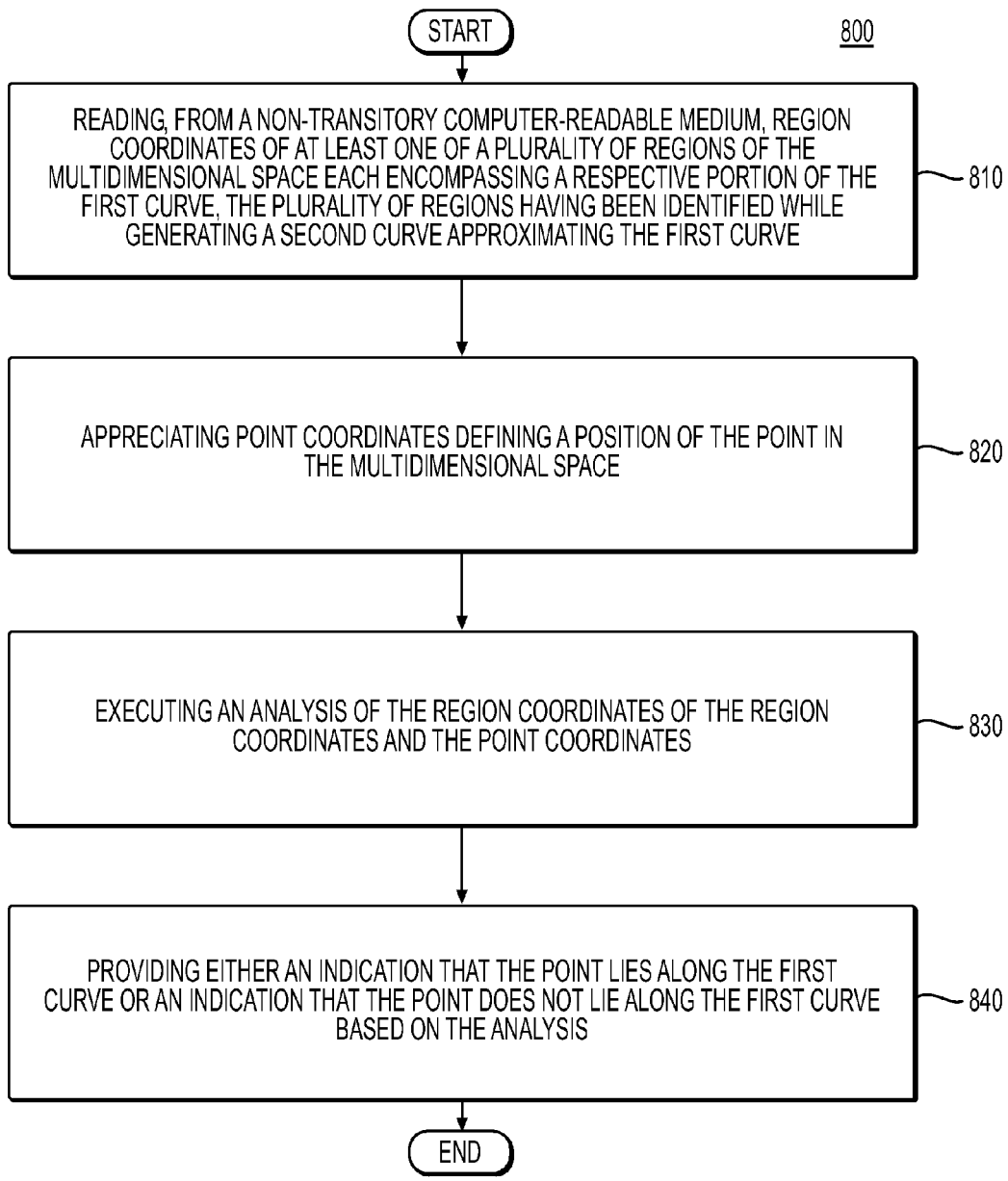

In other cases, as described above, the analysis may not be performed as part of the method 700, but as an independent computer-implemented method 800 for determining whether a point lies along a first curve in a multidimensional space, as depicted in FIG. 22. For example, method 800 may be carried out in the context of another computer system 100 having region coordinates stored in a non-transitory computer-readable medium such as a solid state drive 120 or a random access memory 130.

At step 810, the region coordinates of at least one of a plurality of regions of the multidimensional space each encompassing a respective portion of the first curve, the plurality of regions having been identified while generating a second curve approximating the first curve, are read from the non-transitory computer-readable medium.

At step 820, as at step 740 above, point coordinates defining a position of the point in the multidimensional space are appreciated.

At step 830, as at step 750 above, the analysis of the region coordinates and the point coordinates is executed.

At step 840, as at step 760 above, either an indication that the point lies along the first curve or an indication that the point does not lie along the first curve is provided to a user of the electronic device based on the analysis.

In some implementations, step 760 or step 840, as the case may be, comprises providing the indication that the point does not lie along the first curve after determining that the point lies inside none of the regions. In some implementations, providing the indication that the point does not lie along the first curve after determining that the point lies inside a region being a member of a first set of regions having been identified during generation of a first version of the second curve, the first version of the second curve being a first polygonal chain; and determining that the point lies inside no region being a member of the second set of the regions having been identified during generation of a second version of the second curve, the second version of the second curve being a second polygonal chain having more line segments than the first polygonal chain.

In some implementations, three or more sets of regions may be traversed before finding that the point lies outside all of the members of a set of regions and thereby determining that the point does not lie along the first curve.

In some implementations, step 760 or step 840, as the case may be, comprises providing the indication that the point lies along the first curve after determining that the point lies inside one of the regions based on the analysis of the point coordinates and the region coordinates (performed at step 750 or step 830) and determining that a boundary distance of that region is no greater than a threshold value, as described above with reference to FIG. 18. In some implementations, this occurs only after an earlier determination that the point also lies inside another region associated with a line segment of a second curve less completely approximating the first curve, as described above with reference to FIG. 17.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method for determining whether a point lies along a first curve in a multidimensional space, the method executable by a processor of an electronic device, the point and the first curve being presented on a display interface of the electronic device, the point on the display interface corresponding to a click from a user of the electronic device, the method comprising:
   determining first curve coordinates defining each of a position and a form of the first curve generated in the multidimensional space and presented on the display interface;
   based on the first curve coordinates, identifying regions of the multidimensional space each encompassing a respective portion of the first curve while generating a second curve approximating the first curve, the identifying the regions including:
      identifying a first set of the regions while generating a first version of the second curve, the first version of the second curve being a first polygonal chain, and
      identifying a second set of the regions while generating a second version of the second curve, the second version of the second curve being a second polygonal chain having more line segments than the first polygonal chain;
   storing, in a non-transitory computer-readable medium, region coordinates of at least one of the regions;
   analyzing the region coordinates and point coordinates defining a position of the point in the multidimensional space, the analyzing being configured for providing, on the display interface, one of:
   an indication that the point lies along the first curve, the indication that the point lies along the first curve being an indication that the user has clicked on the first curve; and
   an indication that the point does not lie along the first curve, the indication that the point does not lie along the first curve being an indication that the user has not clicked on the first curve.

2. The method of claim 1, wherein:
   identifying the first set of the regions comprises determining that at least one member of the first set of the regions has a boundary distance greater than a threshold value; and
   identifying the second set of the regions comprises determining that no member of the second set of the regions has a boundary distance greater than the threshold value.

3. The method of claim 1, wherein generating the second curve approximating the first curve comprises executing a Ramer-Douglas-Peucker algorithm.

4. The method of claim 1, further comprising:
   determining the point coordinates defining the position of the point in the multidimensional space;
   executing the analysis of the region coordinates and the point coordinates; and
   providing, to a user of the electronic device, either the indication that the point lies along the first curve or the indication that the point does not lie along the first curve based on the analysis.

5. The method of claim 4, wherein providing either the indication that the point lies along the first curve or the indication that the point does not lie along the first curve based on the analysis of the point coordinates and the region coordinates comprises providing the indication that the point does not lie along the first curve after determining that the point lies inside none of the regions.

6. The method of claim 4, wherein providing either the indication that the point lies along the first curve or the indication that the point does not lie along the first curve based on the analysis of the point coordinates and the region coordinates comprises providing the indication that the point does not lie along the first curve after:
   determining that the point lies inside a region being a member of a first set of the regions having been identified during generation of a first version of the second curve, the first version of the second curve being a first polygonal chain; and
   determining that the point lies inside no region being a member of a second set of the regions having been identified during generation of a second version of the second curve, the second version of the second curve being a second polygonal chain having more line segments than the first polygonal chain.

7. The method of claim 4, wherein providing either the indication that the point lies along the first curve or the indication that the point does not lie along the first curve based on the analysis of the point coordinates and the region coordinates comprises providing the indication that the point lies along the first curve after:
   determining that the point lies inside a region being one of the regions; and
   determining that a boundary distance of the region is no greater than a threshold value, the boundary distance of the region being a shortest distance to a most distant point inside the region from a line approximating the respective portion of the first curve of the region.

8. The method of claim 4, wherein providing either the indication that the point lies along the first curve or the indication that the point does not lie along the first curve based on the analysis of the point coordinates and the region coordinates comprises providing the indication that the point does not lie along the first curve after:
   determining that the point lies inside a region being a member of a first set of the regions having been identified during generation of a first version of the second curve, the first version of the second curve being a first polygonal chain, at least one member of the first set of the regions having a boundary distance greater than a threshold value; and determining that the point lies inside no region being a member of a second set of the regions having been identified during generation of a second version of the second curve, the second version of the second curve being a second polygonal chain having more line segments than the first polygonal chain, no member of the second set of the regions having a boundary distance greater than the threshold value.

9. The method of claim 4, wherein provision of either the indication that the point lies along the first curve or the indication that the point does not lie along the first curve based on the analysis of the point coordinates and the region coordinates comprises provision of the indication that the point does not lie along the first curve after:

determination that the point lies inside a region being a member of a first set of the regions having been identified during generation of a first version of the second curve, the first version of the second curve being a first polygonal chain, at least one member of the first set of the regions having a boundary distance greater than a threshold value; and determination that the point lies inside no region being a member of a second set of the regions having been identified during generation of a second version of the second curve, the second version of the second curve being a second polygonal chain having more line segments than the first polygonal chain, no member of the second set of the regions having a boundary distance greater than the threshold value.

10. The method of claim 1, wherein each one of the regions consists of all points no further than a boundary distance from a line approximating the respective portion of the first curve of the one of the regions, the boundary distance being a shortest distance from the line to a point most distant from the line on the respective portion of the first curve.

11. The method of claim 10, wherein the multidimensional space has only two dimensions, and each one of the regions is a respective area of the multidimensional space.

12. The method of claim 1, wherein the multidimensional space has only two dimensions, and each one of the regions is a respective area of the multidimensional space consisting of:

all points no further than a first boundary distance away from a first side of a line approximating the respective portion of the first curve of the one of the regions, the first boundary distance being a shortest distance away from the first side of the line to a point most distant from the first side of the line on the respective portion of the first curve; and all points no further than a second boundary distance away from a second side of the line, the second boundary distance being a shortest distance away from the second side of the line to a point most distant from the second side of the line on the respective portion of the first curve.

13. A non-transitory computer-readable medium storing program instructions for determining whether a point lies along a first curve in a multidimensional space, the program instructions being executable by a processor of an electronic device, the point and the first curve being presented on a display interface of the electronic device, the point on the display interface corresponding to a click from a user of the electronic device, to effect:

determining first curve coordinates defining each of a position and a form of the first curve generated in the multidimensional space;

based on the first curve coordinates, identifying regions of the multidimensional space each encompassing a respective portion of the first curve while generating a second curve approximating the first curve, the identifying the regions including:

identifying a first set of the regions during generation of a first version of the second curve, the first version of the second curve being a first polygonal chain, and identifying a second set of the regions during generation of a second version of the second curve, the second version of the second curve being a second polygonal chain having more line segments than the first polygonal chain;

storing, in a non-transitory computer-readable medium, of region coordinates of at least one of the regions; and analyzing the region coordinates and point coordinates defining a position of the point in the multidimensional space, the analyzing being configured for providing, on the display interface, one of:

an indication that the point lies along the first curve, the indication that the point lies along the first curve being an indication that the user has clicked on the first curve; and an indication that the point does not lie along the first curve, the indication that the point does not lie along the first curve being an indication that the user has not clicked on the first curve.

14. The medium of claim 13, wherein:

identification of the first set of the regions comprises determining that at least one member of the first set of the regions has a boundary distance greater than a threshold value; and identification of the second set of the regions comprises determining that no member of the second set of the regions has a boundary distance greater than the threshold value.

15. The medium of claim 13, wherein generation of the second curve approximating the first curve comprises execution of a Ramer-Douglas-Peucker algorithm.

16. The medium of claim 13, the program instructions being further executable by the processor to effect:

determining the point coordinates defining the position of the point in the multidimensional space;

execution of the analysis of the region coordinates and the point coordinates; and provision, to a user of the electronic device, of either the indication that the point lies along the first curve or the indication that the point does not lie along the first curve based on the analysis.

17. The medium of claim 16, wherein provision of either the indication that the point lies along the first curve or the indication that the point does not lie along the first curve based on the analysis of the point coordinates and the region coordinates comprises provision of the indication that the point does not lie along the first curve after determining that the point lies inside none of the regions.

18. The medium of claim 16, wherein provision of either the indication that the point lies along the first curve or the indication that the point does not lie along the first curve based on the analysis of the point coordinates and the region coordinates comprises provision of the indication that the point does not lie along the first curve after:

determination that the point lies inside a region being a member of a first set of the regions having been identified during generation of a first version of the second curve, the first version of the second curve being a first polygonal chain; and determination that the point lies inside no region being a member of a second set of the regions having been identified during generation of a second version of the second curve, the second version of the second curve being a second polygonal chain having more line segments than the first polygonal chain.

19. The medium of claim 16, wherein provision of either the indication that the point lies along the first curve or the indication that the point does not lie along the first curve based on the analysis of the point coordinates and the region coordinates comprises provision of the indication that the point lies along the first curve after:
 determination that the point lies inside a region being one of the regions; and
 determination that a boundary distance of the region is no greater than a threshold value, the boundary distance of the region being a shortest distance to a most distant point inside the region from a line approximating the respective portion of the first curve of the region.

20. The medium of claim 13, wherein each one of the regions consists of all points no further than a boundary distance from a line approximating the respective portion of the first curve of the one of the regions, the boundary distance being a shortest distance from the line to a point most distant from the line on the respective portion of the first curve.

21. The medium of claim 20, wherein the multidimensional space has only two dimensions, and each one of the regions is a respective area of the multidimensional space.

22. The medium of claim 13, wherein the multidimensional space has only two dimensions, and each one of the regions is a respective area consisting of:
 all points no further than a first boundary distance away from a first side of a line approximating the respective portion of the first curve of the one of the regions, the first boundary distance being a shortest distance away from the first side of the line to a point most distant from the first side of the line on the respective portion of the first curve; and
 all points no further than a second boundary distance away from a second side of the line, the second boundary distance being a shortest distance away from the second side of the line to a point most distant from the second side of the line on the respective portion of the first curve.

23. A computer-implemented method for determining whether a point lies along a first curve in a multidimensional space, the method executable by a processor of an electronic device, the point and the first curve being presented on a display interface of the electronic device, the point on the display interface corresponding to a click from a user of the electronic device, the method comprising:
 reading, from a non-transitory computer-readable medium, region coordinates of at least one of a plurality of regions of the multidimensional space each encompassing a respective portion of the first curve generated, the plurality of regions having been identified based on coordinates of the first curve during generation of a second curve approximating the first curve, the identification of the plurality of regions including:
  identifying a first set of the regions while generating a first version of the second curve, the first version of the second curve being a first polygonal chain, and
  identifying a second set of the regions while generating a second version of the second curve, the second version of the second curve being a second polygonal chain having more line segments than the first polygonal chain;
 determining point coordinates defining a position of the point in the multidimensional space;
 analyzing the region coordinates and the point coordinates; and
 providing one of:
  an indication that the point lies along the first curve, the indication that the point lies along the first curve being an indication that the user has clicked on the first curve; and
  an indication that the point does not lie along the first curve based on the analysis, the indication that the point does not lie along the first curve being an indication that the user has not clicked on the first curve.

24. The method of claim 23, wherein the providing one of the indication that the point lies along the first curve or the indication that the point does not lie along the first curve further comprises presenting the indication on the display interface of the electronic device.

25. A non-transitory computer-readable medium storing program instructions for determining whether a point lies along a first curve in a multidimensional space, the program instructions being executable by a processor of an electronic device, the point and the first curve being presented on a display interface of the electronic device, the point on the display interface corresponding to a click from a user of the electronic device, to effect:
 reading, from a memory of the electronic device, of region coordinates of at least one of a plurality of regions of the multidimensional space each encompassing a respective portion of the first curve generated, the plurality of regions having been identified based on coordinates of the first curve while generating a second curve approximating the first curve, the identification of the plurality of regions including:
  identifying a first set of the regions while generating a first version of the second curve, the first version of the second curve being a first polygonal chain, and
  identifying a second set of the regions while generating a second version of the second curve, the second version of the second curve being a second polygonal chain having more line segments than the first polygonal chain;
 determining point coordinates defining a position of the point in the multidimensional space;
 analyzing the region coordinates and the point coordinates; and
 providing, on the display interface of the electronic device, based on the analysis, one of:
 an indication that the point lies along the first curve, the indication that the point lies along the first curve being an indication that the user has clicked on the first curve; and
 an indication that the point does not lie along the first curve, the indication that the point does not lie along the first curve being an indication that the user has not clicked on the first curve.

\* \* \* \* \*